United States Patent
Nam et al.

(10) Patent No.: US 9,618,793 B2
(45) Date of Patent: Apr. 11, 2017

(54) LIQUID CRYSTAL DISPLAY DEVICE

(71) Applicant: Samsung Display Co., Ltd., Yongin (KR)

(72) Inventors: Jung-Gun Nam, Seoul (KR); Kyoung-Tai Han, Asan-si (KR); Dae-Young Lee, Suwon-si (KR); Dae-Hwan Jang, Gwangmyeong-si (KR); Gug-Rae Jo, Asan-si (KR); Atsushi Takakuwa, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 75 days.

(21) Appl. No.: 13/958,059

(22) Filed: Aug. 2, 2013

(65) Prior Publication Data

US 2014/0293187 A1    Oct. 2, 2014

(30) Foreign Application Priority Data

Mar. 28, 2013   (KR) .................. 10-2013-0033165

(51) Int. Cl.
*G02F 1/1335* (2006.01)
*G02B 5/30* (2006.01)

(52) U.S. Cl.
CPC .... *G02F 1/13362* (2013.01); *G02F 1/133528* (2013.01); *G02B 5/3025* (2013.01); *G02B 5/3058* (2013.01); *G02F 1/133512* (2013.01); *G02F 1/133536* (2013.01); *G02F 2001/133548* (2013.01)

(58) Field of Classification Search
CPC ... G02F 2001/133548; G02F 1/133528; G02F 1/133536; G02F 1/133512; G02F 1/13362; G02F 1/133605; G02B 5/3041; G02B 5/3025; G02B 5/201; G02B 5/3058

USPC ........... 349/96, 42, 43, 62; 359/483, 483.01, 359/485.05, 352

See application file for complete search history.

(56) References Cited

U.S. PATENT DOCUMENTS

| | | | |
|---|---|---|---|
| 5,724,107 A * | 3/1998 | Nishikawa et al. ............ 349/38 |
| 6,744,480 B2 | 6/2004 | Kaneko |
| 7,443,464 B2 | 10/2008 | Sekiguchi |
| 7,633,566 B2 * | 12/2009 | Utsunomiya et al. .......... 349/12 |
| 8,125,592 B2 | 2/2012 | Takada |
| 2006/0092347 A1 * | 5/2006 | Kim et al. ...................... 349/62 |

(Continued)

FOREIGN PATENT DOCUMENTS

| | | | |
|---|---|---|---|
| JP | 2009086127 A * | 4/2009 |
| JP | 2010-014842 | 1/2010 |

(Continued)

*Primary Examiner* — Paul Lee
*Assistant Examiner* — Jia Pan
(74) *Attorney, Agent, or Firm* — H.C. Park & Associates, PLC

(57) ABSTRACT

A liquid crystal display device includes a liquid crystal display panel and a backlight unit providing light to the liquid crystal display panel. The liquid crystal display panel includes a first substrate on which a thin film transistor is disposed, a second substrate facing the first substrate, a liquid crystal layer disposed between the first substrate and the second substrate, and a first polarizer disposed on the second substrate having a plurality of metal patterns spaced apart from each other by an interval. The backlight unit faces the second substrate.

11 Claims, 20 Drawing Sheets

(56) References Cited

U.S. PATENT DOCUMENTS

| | | | |
|---|---|---|---|
| 2006/0177571 A1* | 8/2006 | Kumai | B82Y 20/00 427/162 |
| 2007/0285598 A1* | 12/2007 | Hwang et al. | 349/96 |
| 2008/0094547 A1* | 4/2008 | Sugita et al. | 349/96 |
| 2008/0100781 A1* | 5/2008 | Choo et al. | 349/96 |
| 2008/0137010 A1 | 6/2008 | Kumai | |
| 2009/0180055 A1* | 7/2009 | Kim et al. | 349/69 |
| 2010/0073599 A1 | 3/2010 | Yoon et al. | |
| 2011/0079782 A1* | 4/2011 | Kim et al. | 257/59 |
| 2011/0222002 A1* | 9/2011 | Lee | G02F 1/133536 349/96 |
| 2012/0057106 A1* | 3/2012 | Park et al. | 349/96 |
| 2013/0148057 A1* | 6/2013 | Kang et al. | 349/64 |

FOREIGN PATENT DOCUMENTS

| | | |
|---|---|---|
| JP | 5067434 | 7/2010 |
| KR | 10-2011-0120718 | 11/2011 |

* cited by examiner

LIQUID CRYSTAL DISPLAY DEVICE

CROSS-REFERENCE TO RELATED APPLICATION

This application claims priority from and the benefit of Korean Patent Application No. 10-2013-0033165, filed on Mar. 28, 2013, which is hereby incorporated by reference for all purposes as if fully set forth herein.

BACKGROUND

Field

Exemplary embodiments of the invention relate to a liquid crystal display device. More particularly, exemplary embodiments of the invention relate to a liquid crystal display device configured to improve the brightness of a display image.

Discussion of the Background

In a liquid crystal display (hereinafter, "LCD") device, the light transmissivity through an array substrate and a facing substrate may be adjusted to display an image according to an arrangement of liquid crystals between the substrates. The LCD device may require a light source to provide light to an LCD panel. The light source is included in a backlight unit of the LCD device. The light from the light source is provided to the LCD panel having the array substrate, the facing substrate, and a liquid crystal layer.

The LCD panel includes a polarizer for polarizing the light on an upper surface or a lower surface of the substrates. For example, polyvinyl alcohol ("PVA") may be used as the polarizer. The quality of the polarizer is deemed good when the polarization ratio and light transmissivity of the polarizer is sufficiently high.

However, about half of the light provided from the light source may be absorbed by the PVA polarizer, thereby reducing the light transmissivity to about 50% or less. Accordingly, light efficiency of the LCD device may be reduced and the brightness of an image may be decreased.

Also, when the LCD device includes metallic material in the polarizer to enhance polarization ratio and light transmissivity, crosstalk may occur between the metallic material and a switching element of the LCD panel.

SUMMARY

Exemplary embodiments of the invention provide an LCD device including a polarizer capable of reducing electronic side effects on a switching element as well as of improving light efficiency of the light provided from a backlight unit.

Additional features of the invention will be set forth in the description which follows, and in part will be apparent from the description, or may be learned by practice of the invention An exemplary embodiment of the present invention discloses an LCD device including an LCD panel and a backlight unit providing light to the LCD panel. The LCD panel may include a first substrate on which a thin film transistor is disposed, a second substrate facing the first substrate, a liquid crystal layer disposed between the first substrate and the second substrate and a first polarizer disposed on the second substrate. The first polarizer may include a plurality of metal patterns spaced apart from each other by a predetermined interval. The backlight unit may face the second substrate.

An exemplary embodiment of the present invention also discloses an LCD device including an LCD panel and a backlight unit providing light to the LCD panel. The LCD panel may include an array substrate, a liquid crystal layer, and a facing substrate. The array substrate may include a transparent substrate, a polarizer disposed on a surface of the transparent substrate, a passivation layer covering the polarizer, and a thin film transistor disposed on the passivation layer. The polarizer may have a plurality of metal patterns spaced apart from each other by an interval. The thin film transistor may be spaced apart from the polarizer in a horizontal direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
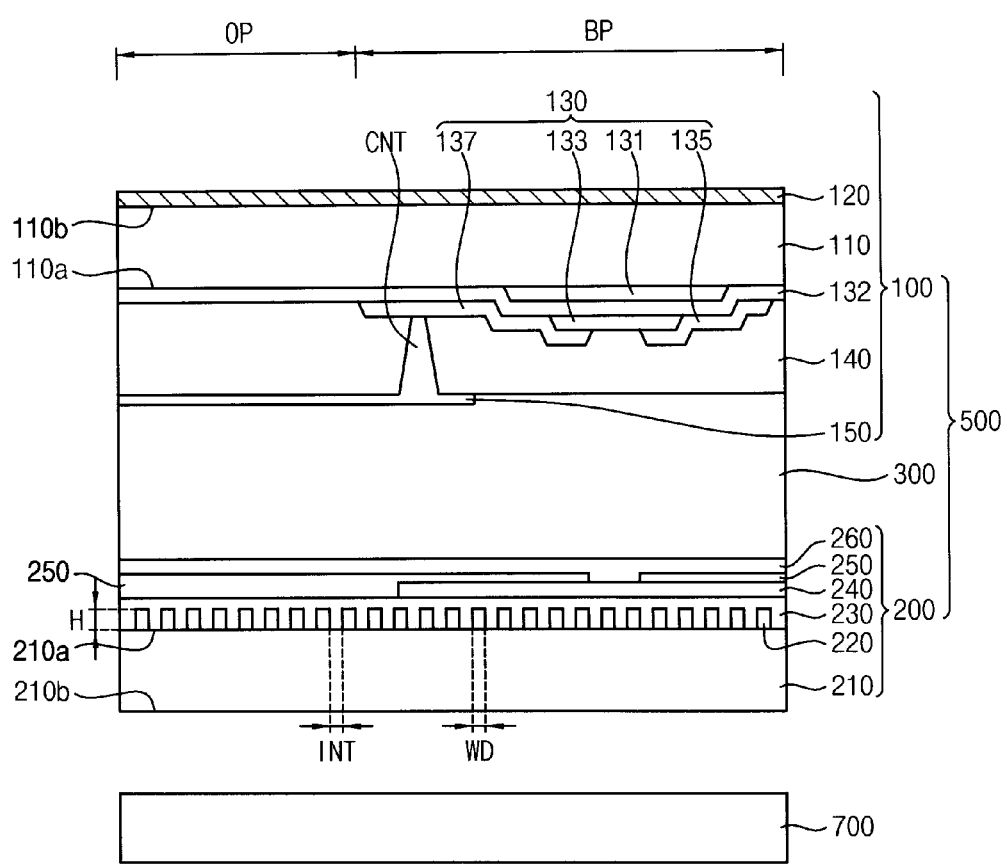
FIG. 1 is a cross-sectional view of an LCD device according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a cross-sectional view of an LCD device according to an exemplary embodiment of the invention.

Referring to FIG. 1, an LCD device includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward outside, while the light-blocking portion BP may block the light from the backlight unit 700.

The array substrate 100 includes a thin film transistor (hereinafter, "TFT") 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300, while the facing substrate 200 is disposed under the liquid crystal layer 300. The backlight unit 700 is disposed under the facing substrate 200.

The array substrate 100 includes a first transparent substrate 110, a light absorption polarizer 120, a TFT 130, a gate insulation layer 132, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material. For example, the first transparent substrate 110 may include glass, quartz, plastic, polyethylene terephthalate resin, polyethylene resin, or polycarbonate resin. Hereinafter, when certain elements are disposed on the first surface 110a, those elements are considered to be sequentially disposed on a lower surface of the first transparent substrate 110. Similarly, when certain elements are disposed on the second surface 110b, those elements are considered to be sequentially disposed on an upper surface of the first transparent substrate 110.

The gate electrode 131 is disposed on the first surface 110a of the first transparent substrate 110 corresponding to the light-blocking portion BP. The gate electrode 131 is electrically connected to a gate line (not shown). A gate on/off signal is applied to the gate electrode 131 from a gate driving part (not shown) to drive the TFT 130. The gate electrode 131 may include copper (Cu) or copper oxide ($CuO_x$). Alternatively, the gate electrode 131 may include gallium doped zinc oxide (GZO), indium doped zinc oxide (IZO), or copper-manganese alloy (CuMn).

The gate insulation layer 132 is disposed on the first surface 110a of the first transparent substrate 110 on which the gate electrode 131 is formed. The gate insulation layer 132 may include transparent insulation material, for example, such as silicon oxide or silicon nitride.

The semiconductor pattern 133 is disposed on the gate insulation layer 132 overlapping the gate electrode 131. The semiconductor pattern 133 may include, for example, indium (In), zinc (Zn), gallium (Ga), tin (Sn), or hafnium (Hf). For example, the semiconductor pattern 133 may be an oxide semiconductor pattern including indium gallium zinc oxide (IGZO), indium tin zinc oxide (ITZO), or hafnium indium zinc oxide (HIZO).

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

The organic insulation layer 140 is disposed on the first surface 110a of the first transparent substrate 110 on which the TFT 130 is formed. The organic insulation layer 140 may have a substantially flat surface. The organic insulation layer 140 may include an organic insulation material such as, for example, acryl resin or phenol resin.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP. The pixel electrode 150 includes a transparent conductive material. For example, the pixel electrode 150 may include indium zinc oxide (IZO), indium tin oxide (ITO), tin oxide ($SnO_x$), or zinc oxide ($ZnO_x$).

The light absorption polarizer 120 is disposed on the second surface 110b of the first transparent substrate 110. The light absorption polarizer 120 may include, for example, a triacetylcelluluose (TAC) layer or a polyvinyl alcohol (PVA) layer.

The facing substrate 200 includes a second transparent substrate 210, a wire grid polarizer 220, a passivation layer 230, a light blocking pattern 240, a color filter pattern, 250 and a common electrode 260.

The second transparent substrate 210 includes a third surface 210a and a fourth surface 210b opposite to the third surface 210a. The second transparent substrate 210 includes a transparent insulation material. The second transparent substrate 210 may include substantially the same material as the first transparent substrate 110. For example, the second transparent substrate 210 may include glass, quartz, plastic, polyethylene terephthalate resin, polyethylene resin, or polycarbonate resin. Hereinafter, when certain elements are disposed on the third surface 210a, those elements are considered to be sequentially disposed on an upper surface of the second transparent substrate 210. Similarly, when certain elements are disposed on the fourth surface 210b, those elements are considered to be sequentially disposed on a lower surface of the second transparent substrate 210.

The wire grid polarizer 220 is disposed on the third surface 210a of the second transparent substrate 210. The wire grid polarizer 220 includes a plurality of metal patterns spaced apart from each other by a desired interval INT. The metal patterns have desired widths WD and thicknesses H, respectively. The width WD and the thickness H of the metal patterns may lie within a range among tens of nanometers to hundreds of nanometers. For example, the thickness H may be substantially three times greater than the width WD. The metal patterns of the wire grid polarizer 220 may be extended in parallel in a horizontal direction. In this case, incident light perpendicular to the horizontal direction may be transmitted through the wire grid polarizer 220 while incident light substantially parallel to the horizontal direction may be reflected by the wire grid polarizer 220. The polarization ratio of the wire grid polarizer 220 may be improved when the width WD and the interval INT are less than a wavelength of the incident light. For example, when visible light having a wavelength within a range of about 400 nanometers to 700 nanometers is incident on the wire grid polarizer 220, the width WD and the interval INT may be substantially no greater than 400 nanometers. For example, the width WD, the interval INT, and the thickness H of the metal patterns may be about 50 nanometers, 50 nanometers, and 150 nanometers, respectively. The wire grid polarizer 220 may include metal or alloy having a high reflectivity. For example, the wire grid polarizer 220 may include aluminum (Al), gold (Au), silver (Ag), copper (Cu), chromium (Cr), iron (Fe), nickel (Ni), or an alloy of these metals.

In the present exemplary embodiment, the wire grid polarizer 220 corresponds to both the opening portion OP and the light-blocking portion BP. A portion of the wire grid polarizer 220 corresponding to the light-blocking portion BP may reflect incident light from the backlight unit 700 with the light blocking pattern 240 while another portion of the wire grid polarizer 220 corresponding to the opening portion OP may allow incident light from the backlight unit 700 to be transmitted. Thus, incident light from the backlight unit 700 may be reflected or transmitted according to an area on which the wire grid polarizer 200 is disposed. The reflection or transmission of incident light from the backlight unit 700 will be described in detail referring to FIG. 2.

In the present exemplary embodiment, the wire grid polarizer 220 in the LCD device is spaced apart from the TFT 130 with the liquid crystal layer 300 arranged therebetween. Therefore, electronic properties of the TFT 130 may be maintained without change because of the presence of the wire grid polarizer 220.

The passivation layer 230 is disposed on the third surface 210a of the second transparent substrate 210 on which the wire grid polarizer 220 is formed. The passivation layer 230 may either entirely or only partially cover the wire grid polarizer 220. The passivation layer 230 may include a transparent material such as, for example, silicon oxide or silicon nitride.

The light blocking pattern 240 is disposed on the passivation layer 230 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the passivation layer 230 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material. For example, the common electrode 260 may include indium zinc oxide (IZO), indium tin oxide (ITO), tin oxide ($SnO_x$), or zinc oxide ($ZnO_x$).

The backlight unit 700 is disposed under the LCD panel 500. The backlight unit 700 may provide light toward the fourth surface 210b of the facing substrate 200.

Figure 2:
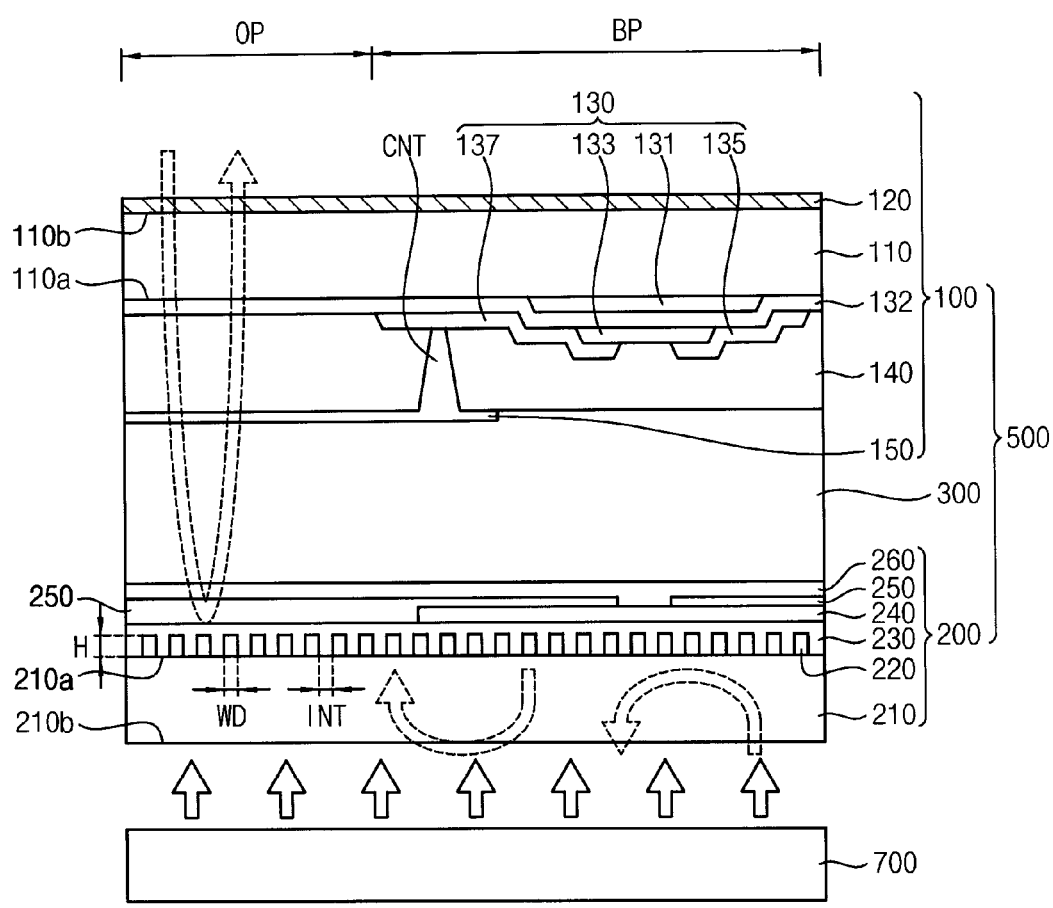
FIG. 2 is a cross-sectional view of the LCD device conceptually illustrating light reflected or polarized within the LCD device of FIG. 1.

FIG. 2 is a cross-sectional view of the LCD device conceptually illustrating light reflected or polarized within the LCD device of FIG. 1.

Referring to FIG. 2, light emitted from the backlight unit 700 is provided to the wire grid polarizer 220 through the second transparent substrate 210. The wire grid polarizer 220 partially transmits the light upward and partially reflects the light downward. In this case, the light transmitted through the wire grid polarizer 220 in the light-blocking portion BP may be reflected downward by the light blocking pattern 240. The downward-reflected light may be reflected again by the second transparent substrate 210 or the backlight unit 700 to arrive at the wire grid polarizer 220.

On the other hand, the light transmitted through the wire grid polarizer 220 in the opening portion OP may sequentially pass the color filter pattern 250 and the liquid crystal layer 300 to arrive at the light absorption polarizer 120 disposed on the first transparent substrate 110. Accordingly, a portion of the light arrived at the light absorption polarizer 120 may be emitted toward the outside while another portion of the light may be absorbed by the light absorption polarizer 120.

Furthermore, ambient light from the LCD panel 500 may be provided to the array substrate 100. In this case, the ambient light may be partially absorbed by the light absorption polarizer 120 and partially transmitted toward the liquid crystal layer 300. The ambient light provided to the liquid crystal layer 300 may be reflected upward by the wire grid polarizer 220 to be again emitted toward the outside.

As mentioned above, the LCD device according to the present exemplary embodiment of the invention may reflect or transmit light from the backlight unit 700 by the wire grid polarizer 220 to improve light usage efficiency. Also, the wire grid polarizer 220 may be spaced apart from the TFT 130 to reduce crosstalk between the wire grid polarizer 220 and the TFT 130.

Figure 3:
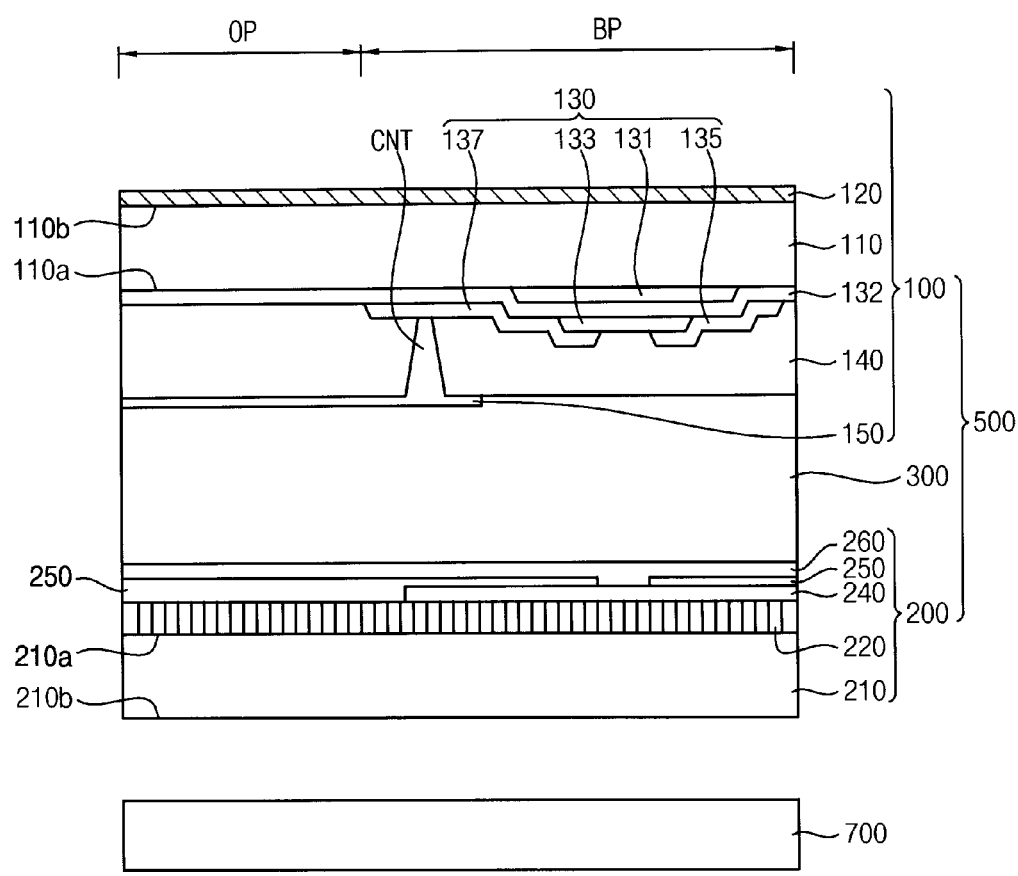
FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, and FIG. 20 are cross-sectional views of LCD devices according to other exemplary embodiments of the present invention.

FIG. 3 is a cross-sectional view of an LCD device according to another exemplary embodiment of the invention.

Referring to FIG. 3, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 1 except that (a) a wire grid polarizer 220 is not covered by a passivation layer and (b) a light blocking pattern 240 and a color filter pattern 250 are directly disposed on the wire grid polarizer 220. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a light absorption polarizer 120, a TFT 130, a gate insulation layer 132, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The gate electrode 131 is disposed on the first surface 110a of the first transparent substrate 110 corresponding to the light-blocking portion BP.

The gate insulation layer 132 is disposed on the first surface 110a of the first transparent substrate 110 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The light absorption polarizer 120 is disposed on the second surface 110b of the first transparent substrate 110.

The facing substrate 200 includes a second transparent substrate 210, a wire grid polarizer 220, a light blocking pattern 240, a color filter pattern 250, and a common electrode 260.

The second transparent substrate 210 includes a third surface 210a and a fourth surface 210b opposite to the third surface 210a. The second transparent substrate 210 may include a transparent insulation material. The second transparent substrate 210 may include substantially the same material as the first transparent substrate 110.

The wire grid polarizer 220 is disposed on the third surface 210a of the second transparent substrate 210. The wire grid polarizer 220 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 220 may be extended in parallel in a horizontal direction. In this case, incident light perpendicular to the horizontal direction may be transmitted through the wire grid polarizer 220, while incident light substantially parallel to the horizontal direction may be reflected by the wire grid polarizer 220. The wire grid polarizer 220 corresponds to both of the opening portion OP and the light-blocking portion BP.

In the present exemplary embodiment, the wire grid polarizer 220 in the LCD device is relatively spaced apart from the TFT 130 with the liquid crystal layer 300 arranged therebetween. Therefore, electronic properties of the TFT 130 may be maintained without change because of the presence of the wire grid polarizer 220.

The light blocking pattern 240 is disposed on the wire grid polarizer 220 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the wire grid polarizer 220 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

In the present exemplary embodiment, the light blocking pattern 240 and the color filter pattern 250 may be directly disposed on the wire grid polarizer 220. In this case, a plurality of air gaps may be formed between adjacent metal patterns of the wire grid polarizer 220. Alternatively, a transparent material may be formed between the adjacent metal patterns of the wire grid polarizer 220 to improve light transmissivity.

The common electrode 260 is disposed on the third surface 210a of the second transparent substrate 210 on which the color filter pattern 250 is formed. The common electrode 260 may include a transparent conductive material.

The backlight unit 700 is disposed under the LCD panel 500. The backlight unit 700 may provide light toward the fourth surface 210b of the facing substrate 200.

As mentioned above, the LCD device according to the present exemplary embodiment of the invention may reflect or transmit light from the backlight unit 700 by utilizing the wire grid polarizer 220 to improve light usage efficiency. Also, the wire grid polarizer 220 may be spaced apart from the TFT 130 to reduce crosstalk between the wire grid polarizer 220 and the TFT 130.

Figure 4:
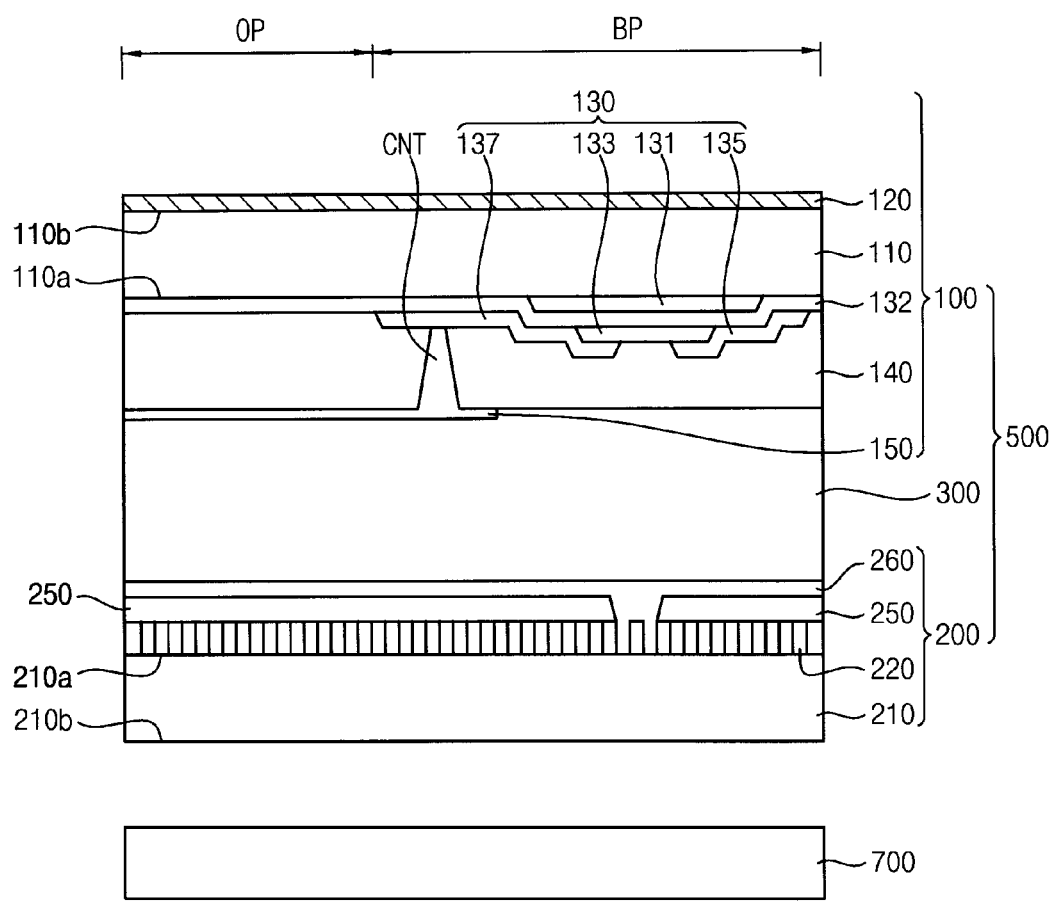

FIG. 4 is a cross-sectional view of an LCD device according to another exemplary embodiment of the invention.

Referring to FIG. 4, an LCD device according to the present exemplary embodiment of the invention includes an LCD panel 500, and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 1 except: (a) a wire grid polarizer 220 is not covered by a passivation layer and a light blocking pattern 240; and (b) a color filter pattern 250 is directly disposed on the wire grid polarizer 220. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a light absorption polarizer 120, a TFT 130, a gate insulation layer 132, an organic insulation layer 140, and a pixel electrode 150. The TFT 130 corresponds to the light-blocking portion BP. The TFT 130 includes a gate electrode 131, a semiconductor pattern 133, a source electrode 135 and a drain electrode 137.

The first transparent substrate 110 has a first surface 110a and a second surface 110b opposite to the first surface 110a. The first transparent substrate 110 includes a transparent insulation material.

The gate electrode 131 is disposed on the first surface 110a of the first transparent substrate 110 corresponding to the light-blocking portion BP.

The gate insulation layer 132 is disposed on the first surface 110a of the first transparent substrate 110 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

In the present exemplary embodiment, the gate electrode 131, the source electrode 135, and the drain electrode 137 may include opaque conductive materials. Accordingly, the gate electrode 131, the source electrode 135, and the drain electrode 137 may block light from the liquid crystal layer 300.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The light absorption polarizer 120 is disposed on the second surface 110b of the first transparent substrate 110.

The facing substrate 200 includes a second transparent substrate 210, a wire grid polarizer 220, a color filter pattern 250, and a common electrode 260.

The second transparent substrate 210 includes a third surface 210a and a fourth surface 210b opposite the third surface 210a. The second transparent substrate 210 includes a transparent insulation material. The second transparent substrate 210 may include substantially the same material as the first transparent substrate 110.

The wire grid polarizer 220 is disposed on the third surface 210a of the second transparent substrate 210. The wire grid polarizer 220 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 220 may be extended in parallel in a horizontal direction. In this case, incident light perpendicular to the horizontal direction may be transmitted through the wire grid polarizer 220 while incident light substantially parallel to the horizontal direction may be reflected by the wire grid polarizer 220. The wire grid polarizer 220 corresponds to both the opening portion OP and the light-blocking portion BP.

In the present exemplary embodiment, the wire grid polarizer 220 in the LCD device is spaced apart from the TFT 130 with the liquid crystal layer 300 arranged therebetween. Therefore, electronic properties of the TFT 130 may be maintained without change because of the presence of the wire grid polarizer 220.

The color filter pattern 250 is disposed on the wire grid polarizer 220. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

In the present exemplary embodiment, the color filter pattern 250 may be directly disposed on the wire grid polarizer 220. In this case, a plurality of air gaps may be formed between adjacent metal patterns of the wire grid polarizer 220. Alternatively, a desired transparent material may be formed between the adjacent metal patterns of the wire grid polarizer 220 to improve light transmissivity.

The common electrode 260 is disposed on the third surface 210a of the second transparent substrate 210 on which the color filter pattern 250 is formed. The common electrode 260 may include a transparent conductive material.

The backlight unit 700 is disposed under the LCD panel 500. The backlight unit 700 may provide light toward the fourth surface 210b of the facing substrate 200.

As mentioned above, the LCD device according to the present exemplary embodiment of the invention may reflect or transmit light from the backlight unit 700 by the wire grid polarizer 220 to improve light usage efficiency. Also, the wire grid polarizer 220 may be spaced apart from the TFT 130 to reduce crosstalk between the wire grid polarizer 220 and the TFT 130.

Figure 5:
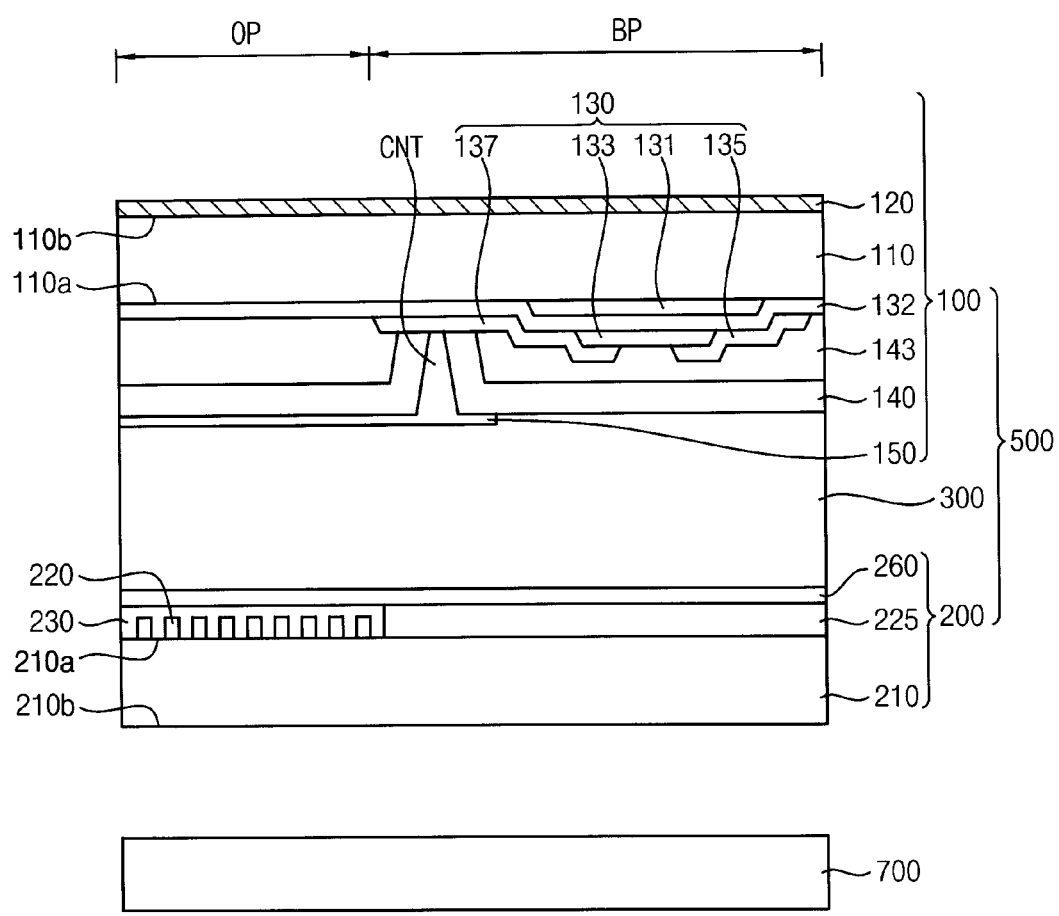

FIG. 5 is a cross-sectional view of an LCD device according to another exemplary embodiment of the invention.

Referring to FIG. 5, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 1 except that: (a) the array substrate 100 includes a color filter pattern 143; and (b) the facing substrate 200 includes a planar ("plate-type") pattern 225 instead of a light blocking pattern. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a light absorption polarizer 120, a TFT 130, a gate insulation layer 132, a color filter pattern 143, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The gate electrode 131 is disposed on the first surface 110a of the first transparent substrate 110 corresponding to the light-blocking portion BP.

The gate insulation layer 132 is disposed on the first surface 110a of the first transparent substrate 110 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

The color filter pattern 143 is disposed on the first surface 110a of the first transparent substrate 110 on which the TFT 130 is formed. The color filter pattern 143 may correspond to the opening portion OP. Also, the color filter pattern 143 may partially correspond to the light-blocking portion BP. The color filter pattern 143 may include a color filter. For example, the color filter pattern 143 may include a red filter, a green filter, or a blue filter.

The organic insulation layer 140 is disposed on the first surface 110a of the first transparent substrate 110 on which the color filter pattern 143 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The light absorption polarizer 120 is disposed on the second surface 110b of the first transparent substrate 110.

The facing substrate 200 includes a second transparent substrate 210, a wire grid polarizer 220, a planar pattern 225, a passivation layer 230, and a common electrode 260.

The second transparent substrate 210 includes a third surface 210a and a fourth surface 210b opposite the third surface 210a. The second transparent substrate 210 includes a transparent insulation material. The second transparent substrate 210 may include substantially the same material as the first transparent substrate 110.

The wire grid polarizer 220 is disposed on the third surface 210a of the second transparent substrate 210. The wire grid polarizer 220 may correspond to the opening portion OP. For example, the wire grid polarizer 220 may be spaced apart from the TFT 130 in a horizontal direction in a plan view. The wire grid polarizer 220 includes a plurality of metal patterns spaced apart from each other with a desired interval between the metal patterns. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 220 may be extended in parallel in a direction. In this case, incident light perpendicular to the direction may be transmitted through the wire grid polarizer 220 while incident light substantially parallel to the direction may be reflected by the wire grid polarizer 220.

The planar pattern 225 is disposed on the third surface 210a of the second transparent substrate 210. The planar pattern 225 may correspond to the light-blocking portion BP. The planar pattern 225 blocks light from the backlight unit 700. In the present exemplary embodiment, the planar pattern 225 may be disposed in a single layer with the wire grid polarizer 220 on the third surface 210a of the second transparent substrate 210. Also, a thickness of the planar pattern 225 may be substantially greater than a thickness of the wire grid polarizer 220. The planar pattern 225 may include substantially the same material as the wire grid polarizer 220. Alternatively, the planar pattern 225 may have a multi-layered structure in which a plurality of metallic materials is stacked.

In the present exemplary embodiment, the wire grid polarizer 220 and the planar pattern 225 in the LCD device are spaced apart from the TFT 130 with the liquid crystal layer 300 arranged therebetween. Therefore, electronic properties of the TFT 130 may be maintained without change because of the presence of the wire grid polarizer 220 and the planar pattern 225.

The passivation layer 230 is disposed on the third surface 210a of the second transparent substrate 210 on which the wire grid polarizer 220 and the planar pattern 225 are formed. The passivation layer 230 may either partially or entirely cover the wire grid polarizer 220 and the planar pattern 225. The passivation layer 230 may include a transparent insulation material.

The common electrode 260 is disposed on the third surface 210a of the second transparent substrate 210 on which the passivation layer 230 is formed. The common electrode 260 may include a transparent conductive material.

The backlight unit 700 is disposed under the LCD panel 500. The backlight unit 700 may provide light toward the fourth surface 210b of the facing substrate 200.

As mentioned above, the LCD device according to the present exemplary embodiment of the invention may reflect or transmit light from the backlight unit 700 by the wire grid polarizer 220 and the planar pattern 225 to improve light usage efficiency. Also, the wire grid polarizer 220 may be spaced apart from the TFT 130 to reduce crosstalk among the wire grid polarizer 220, the planar pattern 225 and the TFT 130.

Figure 6:
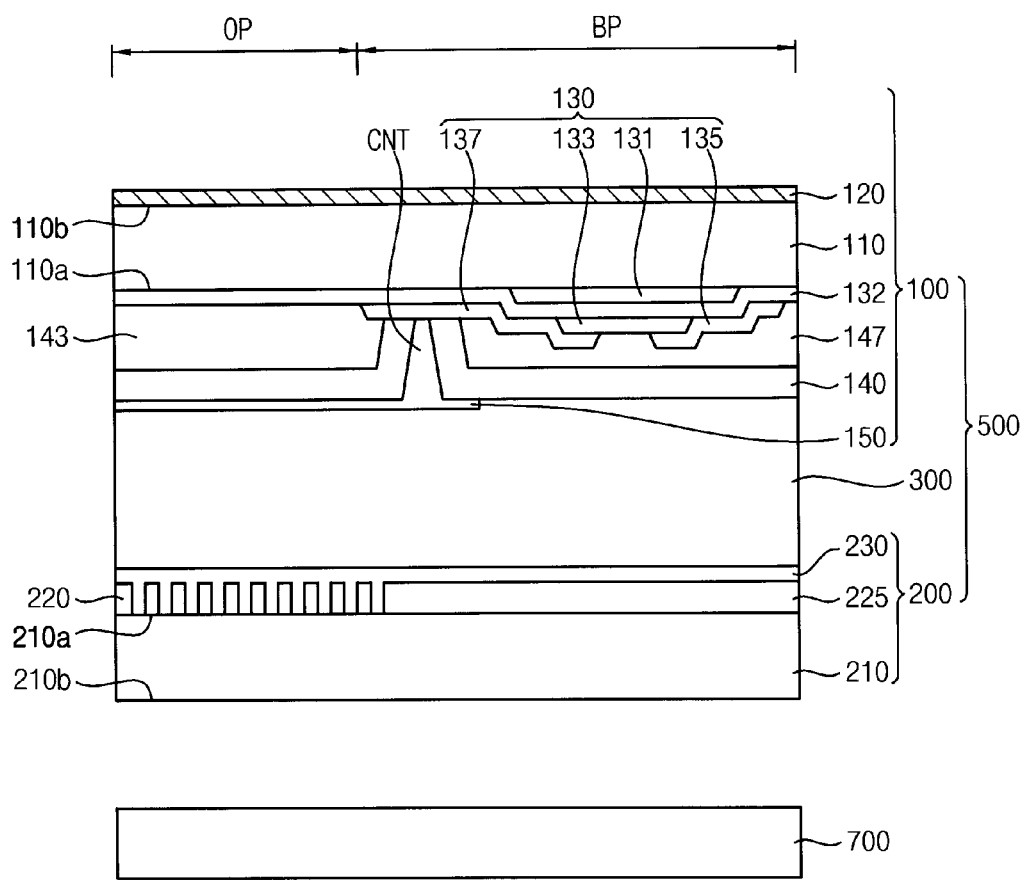

FIG. 6 is a cross-sectional view of an LCD device according to another exemplary embodiment of the invention.

Referring to FIG. 6, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 5 except that: (a) the array substrate 100 includes a light blocking pattern 147 corresponding to the light-blocking portion BP; and (b) the facing substrate 200 does not include a common electrode. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a light absorption polarizer 120, a TFT 130, a gate insulation layer 132, a color filter pattern 143, a light blocking pattern 147, an organic insulation layer 140; and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The gate electrode 131 is disposed on the first surface 110a of the first transparent substrate 110 corresponding to the light-blocking portion BP.

The gate insulation layer 132 is disposed on the first surface 110a of the first transparent substrate 110 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

The color filter pattern 143 is disposed on the first surface 110a of the first transparent substrate 110 on which the TFT 130 is formed. The color filter pattern 143 may correspond to the opening portion OP. Also, the color filter pattern 143 may partially correspond to the light-blocking portion BP. The color filter pattern 143 may include a color filter. For example, the color filter pattern 143 may include a red filter, a green filter, or a blue filter.

The light blocking pattern 147 is disposed on the first surface 110a of the first transparent substrate 110 on which the TFT 130 is formed. The light blocking pattern 147 may correspond to the TFT 130. Also, the light blocking pattern 147 corresponds to the light-blocking portion BP. In this case, the LCD panel 500 according to the present exemplary embodiment may have a BOA (black matrix on array) structure including the TFT 130, the color filter pattern 143, and the light blocking pattern 147.

The organic insulation layer 140 is disposed on the first surface 110a of the first transparent substrate 110 on which the color filter pattern 143 and the light blocking pattern 147 are formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The light absorption polarizer 120 is disposed on the second surface 110b of the first transparent substrate 110.

The facing substrate 200 includes a second transparent substrate 210, a wire grid polarizer 220, a planar pattern 225, and a passivation layer 230.

The second transparent substrate 210 includes a third surface 210a and a fourth surface 210b opposite the third surface 210a. The second transparent substrate 210 includes a transparent insulation material. The second transparent substrate 210 may include substantially the same material as the first transparent substrate 110.

The wire grid polarizer 220 is disposed on the third surface 210a of the second transparent substrate 210. The wire grid polarizer 220 may correspond to the opening portion OP. For example, the wire grid polarizer 220 may be spaced apart from the TFT 130 in a horizontal direction in a plan view. The wire grid polarizer 220 includes a plurality of metal patterns spaced apart from each other at a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 220 may be extended in parallel in a direction. In this case, incident light perpendicular to the direction may be transmitted through the wire grid polarizer 220 while incident light substantially parallel to the direction may be reflected by the wire grid polarizer 220.

The planar pattern 225 is disposed on the third surface 210a of the second transparent substrate 210. The planar pattern 225 may correspond to the light-blocking portion BP. The planar pattern 225 blocks light from the backlight unit 700. In the present exemplary embodiment, the planar pattern 225 may be disposed in a single layer with the wire grid polarizer 220 on the third surface 210a of the second transparent substrate 210. Also, a thickness of the planar pattern 225 may be substantially the same as a thickness of the wire grid polarizer 220. The planar pattern 225 may include substantially the same material as the wire grid polarizer 220. Alternatively, the planar pattern 225 may have a multi-layered structure in which a plurality of metallic materials is stacked.

The passivation layer 230 is disposed on the third surface 210a of the second transparent substrate 210 on which the wire grid polarizer 220 and the planar pattern 225 are formed. The passivation layer 230 may either partially or entirely cover the wire grid polarizer 220 and the planar pattern 225. The passivation layer 230 may include a transparent insulation material.

In the present exemplary embodiment, a common voltage may be applied to the wire grid polarizer 220 and/or the planar pattern 225 to control liquid crystals in the liquid crystal layer 300. In this case, arrangements of the liquid crystals in the liquid crystal layer 300 may be adjusted by the common voltage applied to the wire grid polarizer 220 and/or the planar pattern 225 without the need for an additional common electrode thereon.

Also, the wire grid polarizer 220 and the planar pattern 225 in the LCD device are spaced apart from the TFT 130 by with the liquid crystal layer 300 arranged therebetween. Therefore, electronic properties of the TFT 130 may be maintained without change because of the presence of the wire grid polarizer 220 and the planar pattern 225.

The backlight unit 700 is disposed under the LCD panel 500. The backlight unit 700 may provide light toward the fourth surface 210b of the facing substrate 200.

As mentioned above, the LCD device according to the present exemplary embodiment of the invention may reflect or transmit light from the backlight unit 700 by the wire grid polarizer 220 and the planar pattern 225 to improve light usage efficiency. Also, the wire grid polarizer 220 may be spaced apart from the TFT 130 to reduce crosstalk among the wire grid polarizer 220, the planar pattern 225, and the TFT 130.

Figure 7:
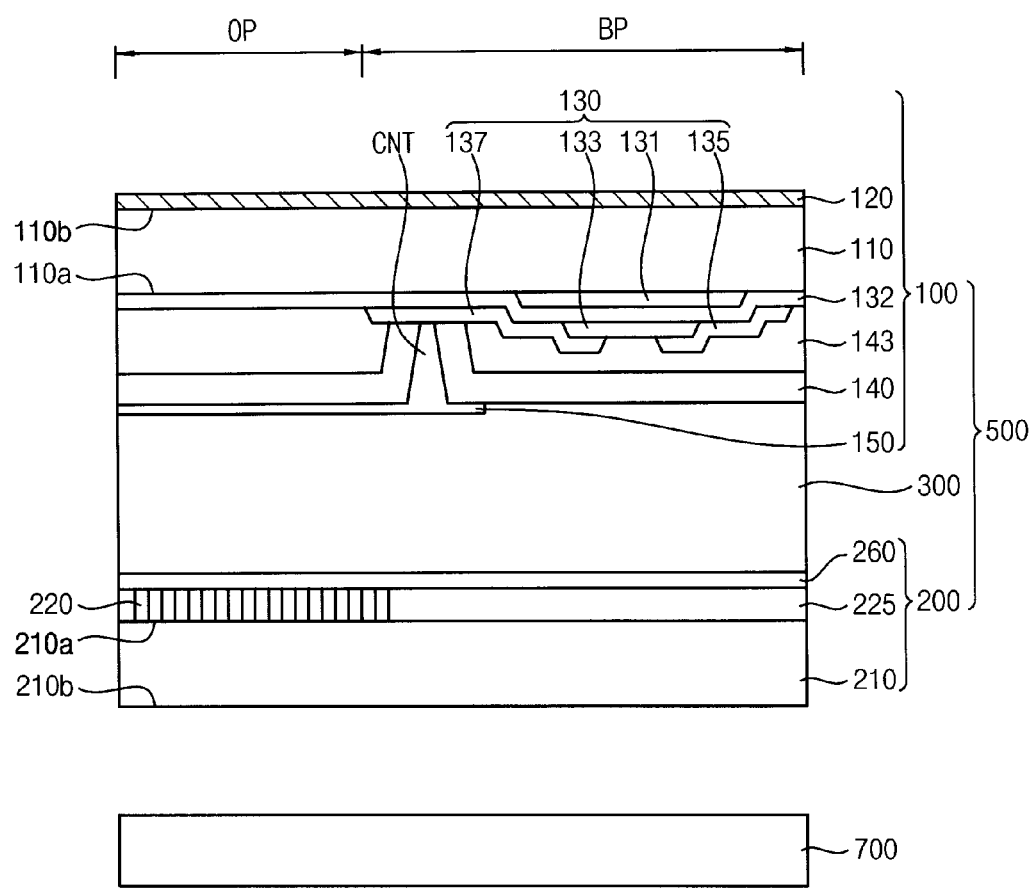

FIG. 7 is a cross-sectional view of an LCD device according to another exemplary embodiment of the invention.

Referring to FIG. 7, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 5 except that: (a) a thickness of a wire grid polarizer 220 is substantially the same as a thickness of a planar pattern 225; and (b) a common electrode 260 is directly disposed on the wire grid polarizer 220 and the planar pattern 225 without a passivation layer. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a light absorption polarizer 120, a TFT 130, a gate insulation layer 132, a color filter pattern 143, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110*a* and a second surface 110*b* opposite to the first surface 110*a*. The first transparent substrate 110 includes a transparent insulation material.

The gate electrode 131 is disposed on the first surface 110*a* of the first transparent substrate 110 corresponding to the light-blocking portion BP.

The gate insulation layer 132 is disposed on the first surface 110*a* of the first transparent substrate 110 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

The color filter pattern 143 is disposed on the first surface 110*a* of the first transparent substrate 110 on which the TFT 130 is formed. The color filter pattern 143 may correspond to the opening portion OP. Also, the color filter pattern 143 may partially correspond to the light-blocking portion BP.

The color filter pattern 143 may include a color filter. For example, the color filter pattern 143 may include a red filter, a green filter, or a blue filter.

The organic insulation layer 140 is disposed on the first surface 110*a* of the first transparent substrate 110 on which the color filter pattern 143 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The light absorption polarizer 120 is disposed on the second surface 110*b* of the first transparent substrate 110.

The facing substrate 200 includes a second transparent substrate 210, a wire grid polarizer 220, a planar pattern 225, and a common electrode 260.

The second transparent substrate 210 includes a third surface 210*a* and a fourth surface 210*b* opposite to the third surface 210*a*. The second transparent substrate 210 includes a transparent insulation material. The second transparent substrate 210 may include substantially the same material as the first transparent substrate 110.

The wire grid polarizer 220 is disposed on the third surface 210*a* of the second transparent substrate 210. The wire grid polarizer 220 may correspond to the opening portion OP. For example, the wire grid polarizer 220 may be spaced apart from the TFT 130 in a horizontal direction in a plan view. The wire grid polarizer 220 includes a plurality of metal patterns spaced apart from each other with a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 220 may be extended in parallel in a direction. In this case, incident light perpendicular to the direction may be transmitted through the wire grid polarizer 220 while incident light substantially parallel to the direction may be reflected by the wire grid polarizer 220.

The planar pattern 225 is disposed on the third surface 210*a* of the second transparent substrate 210. The planar pattern 225 may correspond to the light-blocking portion BP. The planar pattern 225 blocks light from the backlight unit 700. In the present exemplary embodiment, the planar pattern 225 may be disposed in a single layer with the wire grid polarizer 220 on the third surface 210*a* of the second transparent substrate 210. Also, a thickness of the planar pattern 225 may be substantially the same as a thickness of the wire grid polarizer 220. The planar pattern 225 may include substantially the same material as the wire grid polarizer 220. Alternatively, the planar pattern 225 may have a multi-layered structure in which a plurality of metallic materials is stacked.

In the present exemplary embodiment, the wire grid polarizer 220 and the planar pattern 225 in the LCD device are spaced apart from the TFT 130 with the liquid crystal layer 300 arranged therebetween. Therefore, electronic properties of the TFT 130 may be maintained without change as a result of the presence of the wire grid polarizer 220 and the planar pattern 225.

The common electrode 260 is disposed on the third surface 210*a* of the second transparent substrate 210 on which the wire grid polarizer 220 and the planar pattern 225 are formed. The common electrode 260 may include a transparent conductive material.

In the present exemplary embodiment, the common electrode 260 may be directly disposed on the wire grid polarizer 220 and the planar pattern 225. In this case, a plurality of air gaps may be formed between adjacent metal patterns of the wire grid polarizer 220. Alternatively, a desired transparent material may be formed between the adjacent metal patterns to improve light transmissivity.

The backlight unit 700 is disposed under the LCD panel 500. The backlight unit 700 may provide light toward the fourth surface 210b of the facing substrate 200.

As mentioned above, the LCD device according to the present exemplary embodiment of the invention may reflect or transmit light from the backlight unit 700 by the wire grid polarizer 220 and the planar pattern 225 to improve light usage efficiency. Also, the wire grid polarizer 220 may be spaced apart from the TFT 130 to reduce crosstalk among the wire grid polarizer 220, the planar pattern 225 and the TFT 130.

Figure 8:
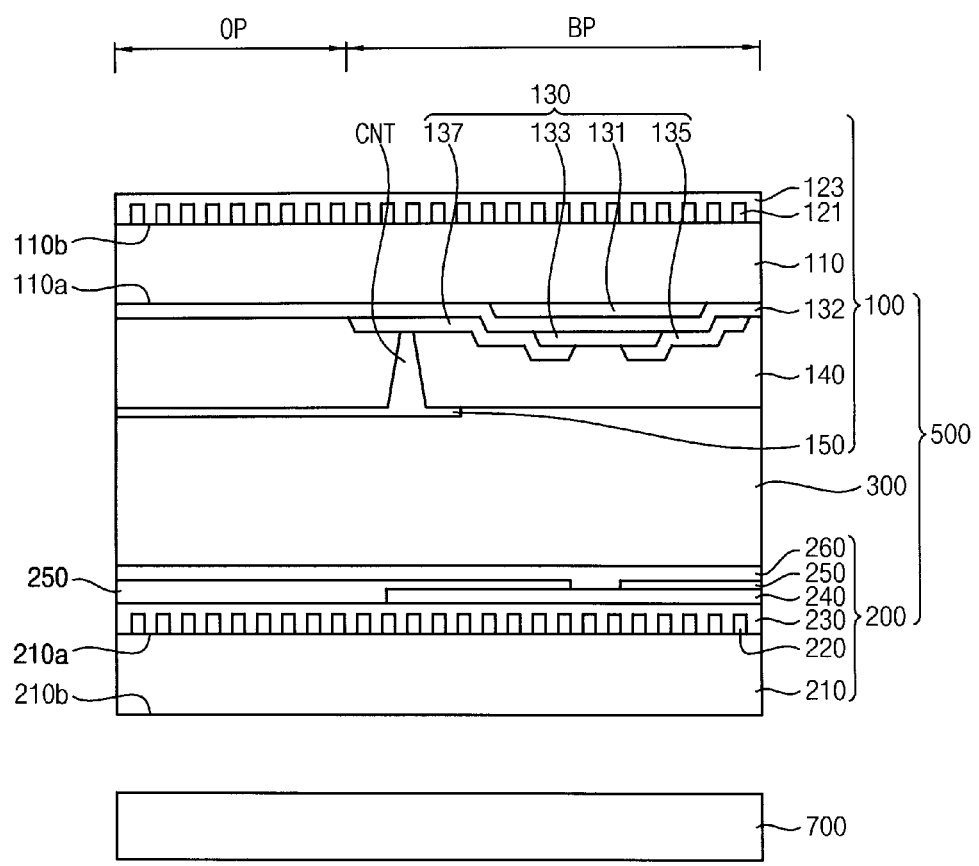

FIG. 8 is a cross-sectional view of an LCD device according to another exemplary embodiment of the invention.

Referring to FIG. 8, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 1 except that the array substrate 100 includes a first wire grid polarizer 121 and a first passivation layer 123 on a second surface 110b instead of a light absorption polarizer. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a first wire grid polarizer 121, a first passivation layer 123, a TFT 130, a gate insulation layer 132, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The gate electrode 131 is disposed on the first surface 110a of the first transparent substrate 110 corresponding to the light-blocking portion BP.

The gate insulation layer 132 is disposed on the first surface 110a of the first transparent substrate 110 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The first wire grid polarizer 121 is disposed on the second surface 110b of the first transparent substrate 110. The first wire grid polarizer 121 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the first wire grid polarizer 121 may be extended in parallel in a horizontal direction. The first wire grid polarizer 121 corresponds to both of the opening portion OP and the light-blocking portion BP.

In the present exemplary embodiment, the first wire grid polarizer 121 in the LCD device is spaced apart from the TFT 130 with the first transparent substrate 110 arranged therebetween. Therefore, electronic properties of the TFT 130 may be maintained without change as a result of the presence of the first wire grid polarizer 121.

The first passivation layer 123 is disposed on the second surface 110b of the first transparent substrate 110 on which the first wire grid polarizer 121 is formed. The first passivation layer 123 may either partially or entirely cover the first wire grid polarizer 121. The first passivation layer 123 may include a transparent insulation material.

The facing substrate 200 includes a second transparent substrate 210, a second wire grid polarizer 220, a second passivation layer 230, a light blocking pattern 240, a color filter pattern 250, and a common electrode 260.

The second transparent substrate 210 includes a third surface 210a and a fourth surface 210b opposite the third surface 210a. The second transparent substrate 210 includes a transparent insulation material. The second transparent substrate 210 may include substantially the same material as the first transparent substrate 110.

The second wire grid polarizer 220 is disposed on the third surface 210a of the second transparent substrate 210. The second wire grid polarizer 220 includes a plurality of metal patterns spaced apart from each other at a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 220 may be extended in parallel in a horizontal direction. In this case, incident light perpendicular to the horizontal direction may be transmitted through the wire grid polarizer 220 while incident light substantially parallel to the horizontal direction may be reflected by the wire grid polarizer 220. In the present exemplary embodiment, the second wire grid polarizer 220 corresponds to both the opening portion OP and the light-blocking portion BP.

In the present exemplary embodiment, the first wire grid polarizer 121 may have a lower reflectivity than the second wire grid polarizer 220. For example, the first wire grid polarizer 121 may include a material having a low reflectivity on top of metal patterns of the first wire grid polarizer 121. In this case, as the first wire grid polarizer 121 on the array substrate 100 has a lower reflectivity than the second wire grid polarizer 220 on the facing substrate 200, outer light may transmit the first wire grid polarizer 121 toward the liquid crystal layer 300. For example, the first wire grid polarizer 121 may include substantially the same material as the second wire grid polarizer 220.

As mentioned above, the first wire grid polarizer 121 and the second wire grid polarizer 220 are spaced apart from the TFT 130 with the first transparent substrate 110 and the liquid crystal layer 300 arranged respectively therebetween. Therefore, electronic properties of the TFT 130 may be maintained without change as a result of the presence of the first wire grid polarizer 121 and the second wire grid polarizer 220.

The second passivation layer 230 is disposed on the third surface 210a of the second transparent substrate 210 on which the second wire grid polarizer 220 is formed. The second passivation layer 230 may either partially or entirely cover the second wire grid polarizer 220. The second passivation layer 230 may include a transparent insulation material.

The light blocking pattern 240 is disposed on the second wire grid polarizer 230 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the second passivation layer 230 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The backlight unit 700 is disposed under the LCD panel 500. The backlight unit 700 may provide light toward the fourth surface 210b of the facing substrate 200.

As mentioned above, the LCD device according to the present exemplary embodiment of the invention may reflect or transmit light from the backlight unit 700 by the first and second wire grid polarizers 121, 220 to improve light usage efficiency. Also, the first and second wire grid polarizers 121, 220 may be spaced apart from the TFT 130 to reduce crosstalk between the first and second wire grid polarizers 121, 220 and the TFT 130.

Figure 9:
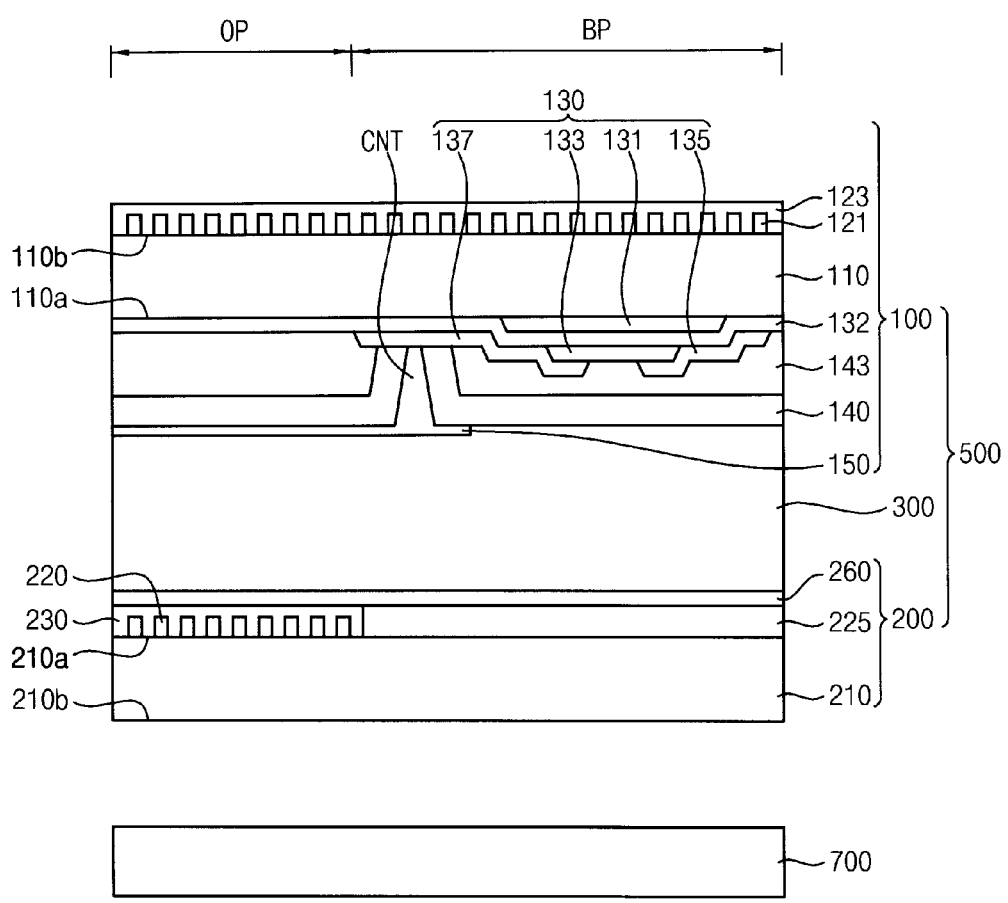

FIG. 9 is a cross-sectional view of an LCD device according to another exemplary embodiment of the invention.

Referring to FIG. 9, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 5 except that the array substrate 100 includes a first wire grid polarizer 121 and a first passivation layer 123 on a second surface 110b instead of a light absorption polarizer. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a first wire grid polarizer 121, a first passivation layer 123, a TFT 130, a gate insulation layer 132, a color filter pattern 143, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The gate electrode 131 is disposed on the first surface 110a of the first transparent substrate 110 corresponding to the light-blocking portion BP.

The gate insulation layer 132 is disposed on the first surface 110a of the first transparent substrate 110 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

The color filter pattern 143 is disposed on the first surface 110a of the first transparent substrate 110 on which the TFT 130 is formed. The color filter pattern 143 may correspond to the opening portion OP. Also, the color filter pattern 143 may partially correspond to the light-blocking portion BP. The color filter pattern 143 may include a color filter. For example, the color filter pattern 143 may include a red filter, a green filter, or a blue filter.

The organic insulation layer 140 is disposed on the first surface 110a of the first transparent substrate 110 on which the color filter pattern 143 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The first wire grid polarizer 121 is disposed on the second surface 110*b* of the first transparent substrate 110. The first wire grid polarizer 121 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the first wire grid polarizer 121 may be extended in parallel in a horizontal direction. The first wire grid polarizer 121 corresponds to both of the opening portion OP and the light-blocking portion BP.

In the present exemplary embodiment, the first wire grid polarizer 121 in the LCD device is spaced apart from the TFT 130 with the first transparent substrate 110 arranged therebetween. Therefore, the electronic properties of the TFT 130 may be maintained without changing due to the first wire grid polarizer 121.

The first passivation layer 123 is disposed on the second surface 110*b* of the first transparent substrate 110 on which the first wire grid polarizer 121 is formed. The first passivation layer 123 may either partially or entirely cover the first wire grid polarizer 121. The first passivation layer 123 may include a transparent insulation material.

The facing substrate 200 includes a second transparent substrate 210, a second wire grid polarizer 220, a planar pattern 225, a second passivation layer 230, and a common electrode 260.

The second transparent substrate 210 includes a third surface 210*a* and a fourth surface 210*b* opposite the third surface 210*a*. The second transparent substrate 210 includes a transparent insulation material. The second transparent substrate 210 may include substantially the same material as the first transparent substrate 110.

The second wire grid polarizer 220 is disposed on the third surface 210*a* of the second transparent substrate 210. The second wire grid polarizer 220 may correspond to the opening portion OP. For example, the second wire grid polarizer 220 may be spaced apart from the TFT 130 in a horizontal direction in a plan view. The second wire grid polarizer 220 includes a plurality of metal patterns spaced apart from each other by a desired interval. The metal patterns may have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the second wire grid polarizer 220 may be extended in parallel in a direction. In this case, incident light perpendicular to the direction may be transmitted through the second wire grid polarizer 220 while incident light substantially parallel to the direction may be reflected by the second wire grid polarizer 220.

In the present exemplary embodiment, the first wire grid polarizer 121 may have a lower reflectivity than the second wire grid polarizer 220. For example, the first wire grid polarizer 121 may include a material having a low reflectivity on top of metal patterns of the first wire grid polarizer 121. In this case, because the first wire grid polarizer 121 on the array substrate 100 has a lower reflectivity than the second wire grid polarizer 220 on the facing substrate 200, ambient light may be transmitted from the first wire grid polarizer 121 toward the liquid crystal layer 300. For example, the first wire grid polarizer 121 may include substantially the same material as the second wire grid polarizer 220.

The planar pattern 225 is disposed on the third surface 210*a* of the second transparent substrate 210. The planar pattern 225 may correspond to the light-blocking portion BP. The planar pattern 225 blocks light from the backlight unit 700. In the present exemplary embodiment, the planar pattern 225 may be disposed in a single layer with the second wire grid polarizer 220 on the third surface 210*a* of the second transparent substrate 210. Also, a thickness of the planar pattern 225 may be substantially greater than a thickness of the second wire grid polarizer 220. The planar pattern 225 may include substantially the same material as the second wire grid polarizer 220. Alternatively, the planar pattern 225 may have a multi-layered structure in which a plurality of metallic materials is stacked.

As mentioned above, the first wire grid polarizer 121, the second wire grid polarizer 220, and the planar pattern 225 in the LCD device are spaced apart from the TFT 130 with the first transparent substrate 110 or the liquid crystal layer 300 arranged therebetween. Therefore, electronic properties of the TFT 130 may be maintained without change as a result of the presence of the first wire grid polarizer 121, the second wire grid polarizer 220, and the planar pattern 225.

The second passivation layer 230 is disposed on the third surface 210*a* of the second transparent substrate 210 on which the second wire grid polarizer 220 and the planar pattern 225 are formed. The second passivation layer 230 may either partially or entirely cover the second wire grid polarizer 220 and the planar pattern 225. The second passivation layer 230 may include a transparent insulation material.

The common electrode 260 is disposed on the third surface 210*a* of the second transparent substrate 210 on which the passivation layer 230 is formed. The common electrode 260 may include a transparent conductive material.

The backlight unit 700 is disposed under the LCD panel 500. The backlight unit 700 may provide light toward the fourth surface 210*b* of the facing substrate 200.

As mentioned above, the LCD device according to the present exemplary embodiment of the invention may reflect or transmit light from the backlight unit 700 by the first and second wire grid polarizers 121, 220 and the planar pattern 225 to improve light usage efficiency. Also, the first and second wire grid polarizers 121, 220 may be spaced apart from the TFT 130 to reduce crosstalk among the first and second wire grid polarizers 121, 220, the planar pattern 225, and the TFT 130.

Figure 10:
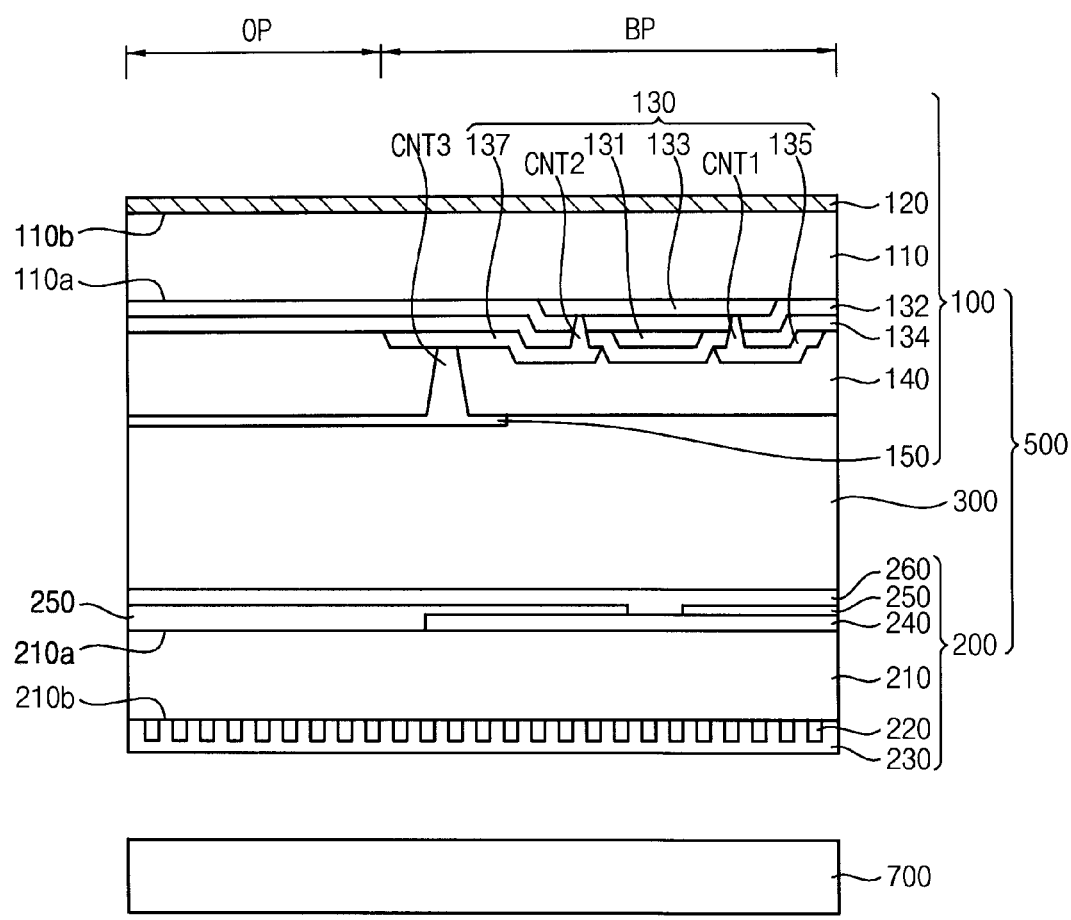

FIG. 10 is a cross-sectional view of an LCD device according to another exemplary embodiment of the invention.

Referring to FIG. 10, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 1 except that: (a) a wire grid polarizer 220 is disposed on a fourth surface 210b of a second transparent substrate 210; and (b) a TFT 130 has a top-gate structure in the array substrate 100. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a light absorption polarizer 120, a TFT 130, a gate insulation layer 132, an inorganic insulation layer 134, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The semiconductor pattern 133 is disposed on the first surface 110a of the first transparent substrate 110 corresponding to the light-blocking portion BP.

The gate insulation layer 132 is disposed on the first surface 110a of the first transparent substrate 110 on which the semiconductor pattern 133 is formed.

The gate electrode 131 is disposed on the gate insulation layer 132 to overlap the semiconductor pattern 133.

The inorganic insulation layer 134 is disposed on the gate insulation layer 132 on which the gate electrode 131 is formed. The inorganic insulation layer 134 may have substantially the same material as the gate insulation layer 132.

The source electrode 135 is disposed on the inorganic insulation layer 134 to overlap an end portion of the semiconductor pattern 133. The source electrode 135 contacts the semiconductor pattern 133 through a first contact hole CNT1 penetrating the inorganic insulation layer 134 and the gate insulation layer 132.

The drain electrode 137 is disposed on the inorganic insulation layer 134 to overlap another end portion of the semiconductor pattern 133. The drain electrode 137 is spaced apart from the source electrode 135. The drain electrode 137 contacts the semiconductor pattern 133 through a second contact hole CNT2 penetrating the inorganic insulation layer 134 and the gate insulation layer 132.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a third contact hole CNT3 penetrating the organic insulation layer 140. The pixel electrode 150 may correspond to the opening portion OP. An end portion of the pixel electrode 150 may partially correspond to the light-blocking portion BP.

The light absorption polarizer 120 is disposed on the second surface 110b of the first transparent substrate 110.

The facing substrate 200 includes a second transparent substrate 210, a wire grid polarizer 220, a passivation layer 230, a light blocking pattern 240, a color filter pattern 250, and a common electrode 260.

The second transparent substrate 210 includes a third surface 210a and a fourth surface 210b opposite the third surface 210a. The second transparent substrate 210 includes a transparent insulation material. The second transparent substrate 210 may include substantially the same material as the first transparent substrate 110.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The wire grid polarizer 220 is disposed on the fourth surface 210b of the second transparent substrate 210. The wire grid polarizer 220 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 220 may be extended in parallel in a horizontal direction. In this case, incident light perpendicular to the horizontal direction may be transmitted through the wire grid polarizer 220 while incident light substantially parallel to the horizontal direction may be reflected by the wire grid polarizer 220. The wire grid polarizer 220 corresponds to both of the opening portion OP and the light-blocking portion BP.

In the present exemplary embodiment, the wire grid polarizer 220 in the LCD device is spaced apart from the TFT 130 with both the liquid crystal layer 300 and the second transparent substrate 210 arranged therebetween. Therefore, electronic properties of the TFT 130 may be maintained without change as a result of the presence of the wire grid polarizer 220.

The passivation layer 230 is disposed on the fourth surface 210b of the second transparent substrate 210 on which the wire grid polarizer 220 is formed. The passivation layer 230 may either partially or entirely cover the wire grid polarizer 220. The passivation layer 230 may include a transparent insulation material.

The backlight unit 700 is disposed under the LCD panel 500. The backlight unit 700 may provide light toward the fourth surface 210b of the facing substrate 200.

As mentioned above, the LCD device according to the present exemplary embodiment of the invention may reflect or transmit light from the backlight unit 700 by the wire grid polarizer 220 to improve light usage efficiency. Also, the wire grid polarizer 220 may be spaced apart from the TFT 130 to reduce crosstalk between the wire grid polarizer 220 and the TFT 130.

Figure 11:
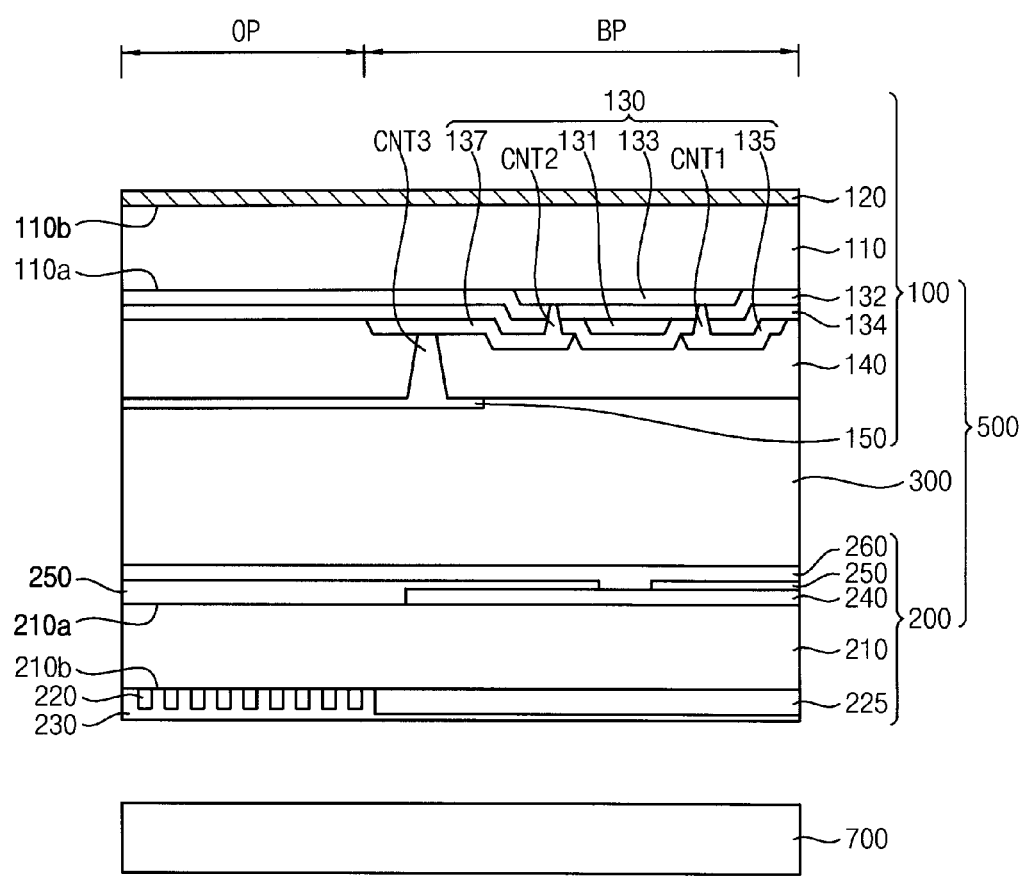

FIG. 11 is a cross-sectional view of an LCD device according to another exemplary embodiment of the invention.

Referring to FIG. 11, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 10 except that the facing substrate 200 includes a planar pattern 225 on a fourth surface 310b. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a light absorption polarizer 120, a TFT 130, a gate insulation layer 132, an inorganic insulation layer 134, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The semiconductor pattern 133 is disposed on the first surface 110a of the first transparent substrate 110 corresponding to the light-blocking portion BP.

The gate insulation layer 132 is disposed on the first surface 110a of the first transparent substrate 110 on which the semiconductor pattern 133 is formed.

The gate electrode 131 is disposed on the gate insulation layer 132 to overlap the semiconductor pattern 133.

The inorganic insulation layer 134 is disposed on the gate insulation layer 132 on which the gate electrode 131 is formed. The inorganic insulation layer 134 may have substantially the same material as the gate insulation layer 132.

The source electrode 135 is disposed on the inorganic insulation layer 134 to overlap an end portion of the semiconductor pattern 133. The source electrode 135 contacts the semiconductor pattern 133 through a first contact hole CNT1 penetrating the inorganic insulation layer 134 and the gate insulation layer 132.

The drain electrode 137 is disposed on the inorganic insulation layer 134 to overlap another end portion of the semiconductor pattern 133. The drain electrode 137 is spaced apart from the source electrode 135. The drain electrode 137 contacts the semiconductor pattern 133 through a second contact hole CNT2 penetrating the inorganic insulation layer 134 and the gate insulation layer 132.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a third contact hole CNT3 penetrating the organic insulation layer 140. The pixel electrode 150 may correspond to the opening portion OP. An end portion of the pixel electrode 150 may partially correspond to the light-blocking portion BP.

The light absorption polarizer 120 is disposed on the second surface 110b of the first transparent substrate 110.

The facing substrate 200 includes a second transparent substrate 210, a wire grid polarizer 220, a planar pattern 225, a passivation layer 230, a light blocking pattern 240, a color filter pattern 250, and a common electrode 260.

The second transparent substrate 210 includes a third surface 210a and a fourth surface 210b opposite to the third surface 210a. The second transparent substrate 210 includes a transparent insulation material. The second transparent substrate 210 may include substantially the same material as the first transparent substrate 110.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The wire grid polarizer 220 is disposed on the fourth surface 210b of the second transparent substrate 210. The wire grid polarizer 220 may correspond to the opening portion OP. For example, the wire grid polarizer 220 may be spaced apart from the TFT 130 in a horizontal direction in a plan view. The wire grid polarizer 220 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval and thickness of the metal patterns may be about 50 nanometers, 50 nanometers, and 150 nanometers, respectively. The metal patterns of the wire grid polarizer 220 may be extended in parallel in a horizontal direction. In this case, incident light perpendicular to the horizontal direction may be transmitted through the wire grid polarizer 220 while incident light substantially parallel to the horizontal direction may be reflected by the wire grid polarizer 220.

The planar pattern 225 is disposed on the fourth surface 210b of the second transparent substrate 210. The planar pattern 225 may correspond to the light-blocking portion BP. The planar pattern 225 blocks light from the backlight unit 700. In the present exemplary embodiment, the planar pattern 225 may be disposed in a single layer with the wire grid polarizer 220 on the fourth surface 210b of the second transparent substrate 210. Also, a thickness of the planar pattern 225 may be substantially greater than a thickness of the wire grid polarizer 220. The planar pattern 225 may include substantially the same material as the wire grid polarizer 220. Alternatively, the planar pattern 225 may have a multi-layered structure in which a plurality of metallic materials is stacked.

In the present exemplary embodiment, the wire grid polarizer 220 and the planar pattern 225 in the LCD device are relatively spaced apart from the TFT 130 by both the liquid crystal layer 300 and the second transparent substrate 210 therebetween. Therefore, electronic properties of the TFT 130 may be maintained without change as a result of the presence of both the wire grid polarizer 220 and the planar pattern 225.

The passivation layer 230 is disposed on the fourth surface 210b of the second transparent substrate 210 on which the wire grid polarizer 220 and the planar pattern are formed. The passivation layer 230 may either partially or entirely cover the wire grid polarizer 220 and the planar pattern 225. The passivation layer 230 may include a transparent insulation material.

The backlight unit 700 is disposed under the LCD panel 500. The backlight unit 700 may provide light toward the fourth surface 210b of the facing substrate 200.

As mentioned above, the LCD device according to the present exemplary embodiment of the invention may reflect or transmit light from the backlight unit 700 by the wire grid polarizer 220 and the planar pattern 225 to improve light usage efficiency. Also, the wire grid polarizer 220 may be spaced apart from the TFT 130 to reduce crosstalk among the wire grid polarizer 220, the planar pattern 225 and the TFT 130.

Figure 12:
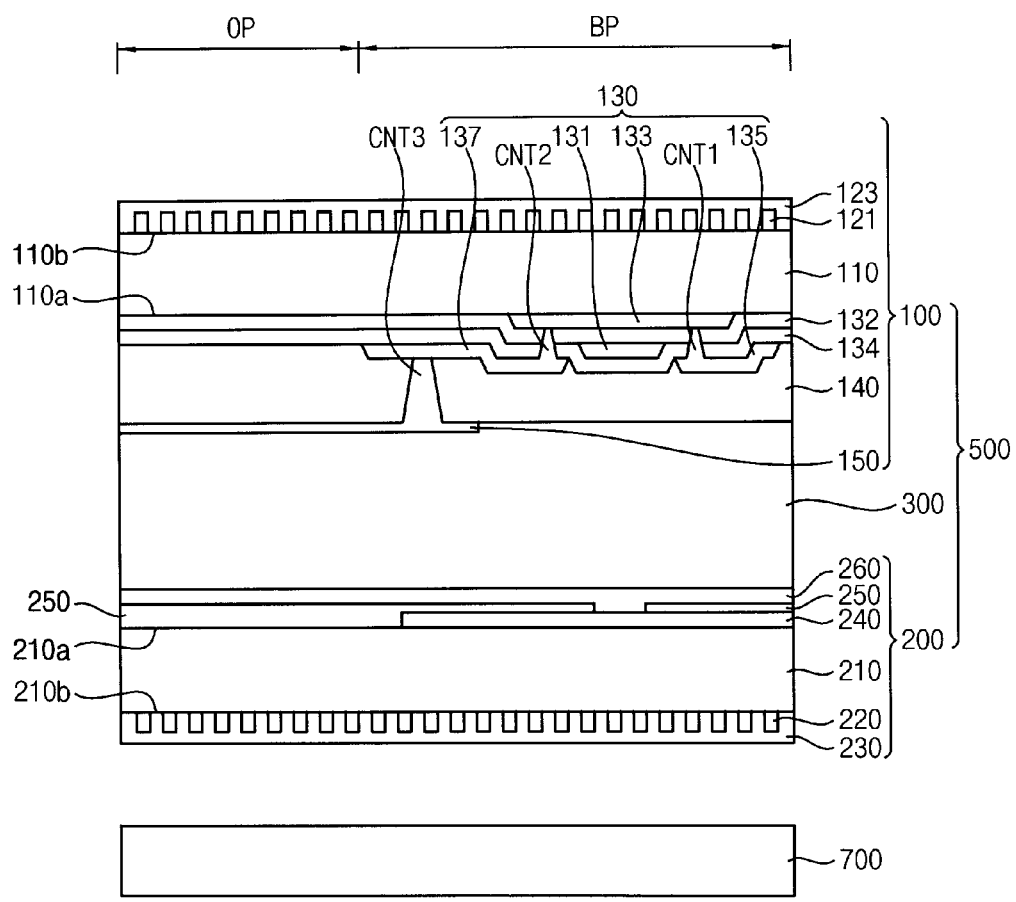

FIG. 12 is a cross-sectional view of an LCD device according to another exemplary embodiment of the invention.

Referring to FIG. 12, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 10 except that the array substrate 100 includes a first wire grid polarizer 121 on a second surface 110b instead of a light absorption polarizer. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a first wire grid polarizer 121, a first passivation layer 123, a TFT 130, a gate insulation layer 132, an inorganic insulation layer 134, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The semiconductor pattern 133 is disposed on the first surface 110a of the first transparent substrate 110 corresponding to the light-blocking portion BP.

The gate insulation layer 132 is disposed on the first surface 110a of the first transparent substrate 110 on which the semiconductor pattern 133 is formed.

The gate electrode 131 is disposed on the gate insulation layer 132 to overlap the semiconductor pattern 133.

The inorganic insulation layer 134 is disposed on the gate insulation layer 132 on which the gate electrode 131 is formed.

The source electrode 135 is disposed on the inorganic insulation layer 134 to overlap an end portion of the semiconductor pattern 133. The source electrode 135 contacts the semiconductor pattern 133 through a first contact hole CNT1 penetrating the inorganic insulation layer 134 and the gate insulation layer 132.

The drain electrode 137 is disposed on the inorganic insulation layer 134 to overlap another end portion of the semiconductor pattern 133. The drain electrode 137 is spaced apart from the source electrode 135. The drain electrode 137 contacts the semiconductor pattern 133 through a second contact hole CNT2 penetrating the inorganic insulation layer 134 and the gate insulation layer 132.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a third contact hole CNT3 penetrating the organic insulation layer 140. The pixel electrode 150 may correspond to the opening portion OP. An end portion of the pixel electrode 150 may partially correspond to the light-blocking portion BP.

The first wire grid polarizer 121 is disposed on the second surface 110b of the first transparent substrate 110. The first wire grid polarizer 121 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the first wire grid polarizer 121 may be extended parallel in a horizontal direction. The first wire grid polarizer 121 corresponds to both of the opening portion OP and the light-blocking portion BP.

In the present exemplary embodiment, the first wire grid polarizer 121 in the LCD device is spaced apart from the TFT 130 with the first transparent substrate 110 arranged therebetween. Therefore, electronic properties of the TFT 130 may be maintained without change as a result of the presence of the first wire grid polarizer 121.

The first passivation layer 123 is disposed on the second surface 110b of the first transparent substrate 110 on which the first wire grid polarizer 121 is formed. The first passivation layer 123 may either partially or entirely cover the first wire grid polarizer 121. The first passivation layer 123 may include a transparent insulation material.

The facing substrate 200 includes a second transparent substrate 210, a second wire grid polarizer 220, a second passivation layer 230, a light blocking pattern 240, a color filter pattern 250, and a common electrode 260.

The second transparent substrate 210 includes a third surface 210a and a fourth surface 210b opposite to the third surface 210a. The second transparent substrate 210 includes a transparent insulation material. The second transparent substrate 210 may include substantially the same material as the first transparent substrate 110.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The second wire grid polarizer 220 is disposed on the fourth surface 210b of the second transparent substrate 210. The second wire grid polarizer 220 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the second wire grid polarizer 220 may be extended in parallel in a horizontal direction. In this case, incident light perpendicular to the horizontal direction may be transmitted through the second wire grid polarizer 220 while incident light substantially parallel to the horizontal direction may be reflected by the second wire grid polarizer 220. In the present exemplary embodiment, the wire grid polarizer 220 corresponds to both of the opening portion OP and the light-blocking portion BP.

In the present exemplary embodiment, the first wire grid polarizer 121 may have a lower reflectivity than the second wire grid polarizer 220. For example, the first wire grid polarizer 121 may include a material having a low reflectivity on top of metal patterns of the first wire grid polarizer 121. In this case, because the first wire grid polarizer 121 on the array substrate 100 has a lower reflectivity than the second wire grid polarizer 220 on the facing substrate 200, ambient light may be transmitted from the first wire grid polarizer 121 toward the liquid crystal layer 300. For example, the first wire grid polarizer 121 may include substantially the same material as the second wire grid polarizer 220.

As mentioned above, the first wire grid polarizer 121 and the second wire grid polarizer 220 in the LCD device are spaced apart from the TFT 130 with the first transparent substrate 110 or the liquid crystal layer 300 arranged therebetween. Therefore, electronic properties of the TFT 130 may be maintained without change as a result of the presence of both the first wire grid polarizer 121 and the second wire grid polarizer 220.

The second passivation layer 230 is disposed on the fourth surface 210b of the second transparent substrate 210 on which the second wire grid polarizer 220 is formed. The second passivation layer 230 may cover the second wire grid polarizer 220 entirely or partially. The second passivation layer 230 may include a transparent insulation material.

The backlight unit 700 is disposed under the LCD panel 500. The backlight unit 700 may provide light toward the fourth surface 210b of the facing substrate 200.

As mentioned above, the LCD device according to the present exemplary embodiment of the invention may reflect or transmit light from the backlight unit 700 by the first and second wire grid polarizers 121, 220 to improve light usage efficiency. Also, the first and second wire grid polarizers 121, 220 may be spaced apart from the TFT 130 to reduce crosstalk among the first and second wire grid polarizers 121, 220 and the TFT 130.

Figure 13:
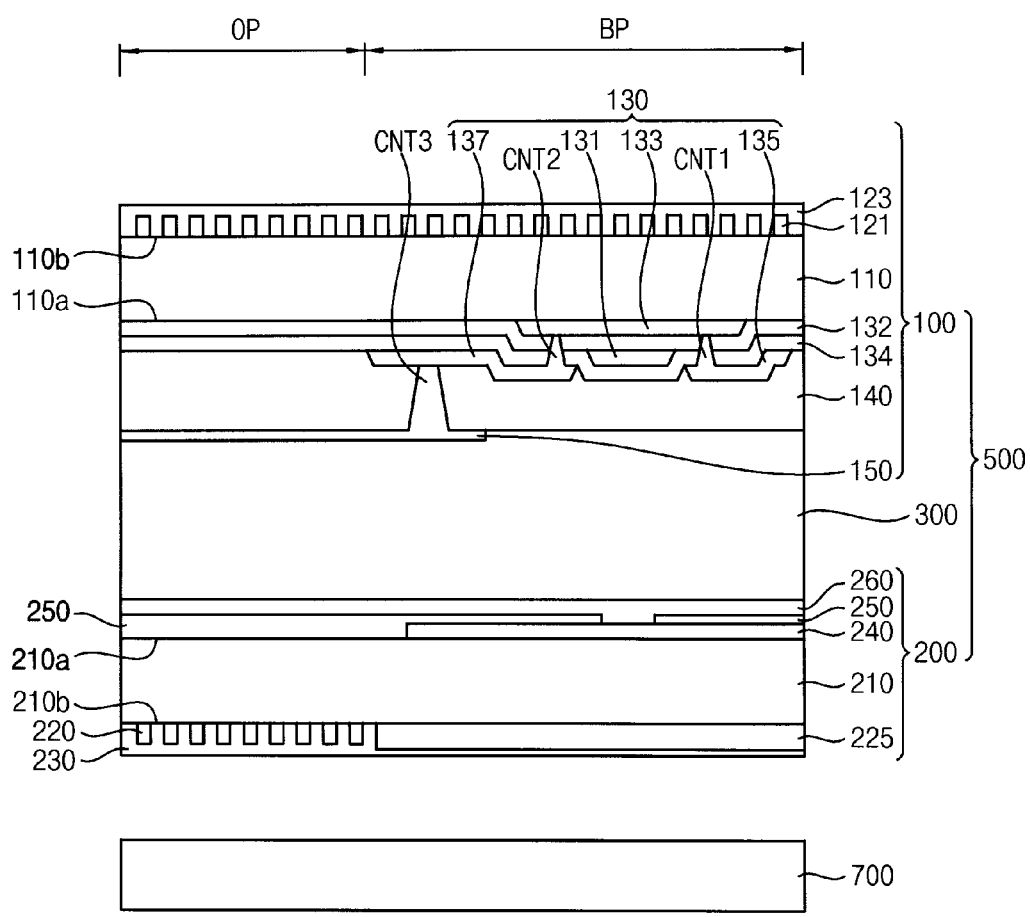

FIG. 13 is a cross-sectional view of an LCD device according to another exemplary embodiment of the invention.

Referring to FIG. 13, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 12 except that the facing substrate 200 includes a planar pattern 225. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed on the liquid crystal layer 300 while the facing substrate 200 is disposed under the liquid crystal layer 300. The backlight unit 700 is disposed under the facing substrate 200.

The array substrate 100 includes a first transparent substrate 110, a first wire grid polarizer 121, a first passivation layer 123, a TFT 130, a gate insulation layer 132, an inorganic insulation layer 134, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The semiconductor pattern 133 is disposed on the first surface 110a of the first transparent substrate 110 corresponding to the light-blocking portion BP.

The gate insulation layer 132 is disposed on the first surface 110a of the first transparent substrate 110 on which the semiconductor pattern 133 is formed.

The gate electrode 131 is disposed on the gate insulation layer 132 to overlap the semiconductor pattern 133.

The inorganic insulation layer 134 is disposed on the gate insulation layer 132 on which the gate electrode 131 is formed.

The source electrode 135 is disposed on the inorganic insulation layer 134 to overlap an end portion of the semiconductor pattern 133. The source electrode 135 contacts the semiconductor pattern 133 through a first contact hole CNT1 penetrating the inorganic insulation layer 134 and the gate insulation layer 132.

The drain electrode 137 is disposed on the inorganic insulation layer 134 to overlap another end portion of the semiconductor pattern 133. The drain electrode 137 is spaced apart from the source electrode 135. The drain electrode 137 contacts the semiconductor pattern 133 through a second contact hole CNT2 penetrating the inorganic insulation layer 134 and the gate insulation layer 132.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a third contact hole CNT3 penetrating the organic insulation layer 140. The pixel electrode 150 may correspond to the opening portion OP. An end portion of the pixel electrode 150 may partially correspond to the light-blocking portion BP.

The first wire grid polarizer 121 is disposed on the second surface 110b of the first transparent substrate 110. The first wire grid polarizer 121 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the first wire grid polarizer 121 may be extended in parallel in a horizontal direction. The first wire grid polarizer 121 corresponds to both the opening portion OP and the light-blocking portion BP.

In the present exemplary embodiment, the first wire grid polarizer 121 in the LCD device is spaced apart from the TFT 130 with the first transparent substrate 110 arranged therebetween. Therefore, electronic properties of the TFT 130 may be maintained without change as a result of the presence of the first wire grid polarizer 121.

The first passivation layer 123 is disposed on the second surface 110b of the first transparent substrate 110 on which the first wire grid polarizer 121 is formed. The first passivation layer 123 may either partially or entirely cover the first wire grid polarizer 121. The first passivation layer 123 may include a transparent insulation material.

The facing substrate 200 includes a second transparent substrate 210, a second wire grid polarizer 220, a planar pattern 225, a second passivation layer 230, a light blocking pattern 240, a color filter pattern 250, and a common electrode 260.

The second transparent substrate 210 includes a third surface 210a and a fourth surface 210b opposite the third surface 210a. The second transparent substrate 210 includes a transparent insulation material. The second transparent substrate 210 may include substantially the same material as the first transparent substrate 110.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The second wire grid polarizer 220 is disposed on the fourth surface 210b of the second transparent substrate 210. The second wire grid polarizer 220 may correspond to the opening portion OP. For example, the second wire grid polarizer 220 may be spaced apart from the TFT 130 in a horizontal direction in a plan view. The second wire grid polarizer 220 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the second wire grid polarizer 220 may be extended in parallel in a direction. In this case, incident light perpendicular to the direction may be transmitted through the second wire grid polarizer 220 while incident light substantially parallel to the direction may be reflected by the second wire grid polarizer 220.

In the present exemplary embodiment, the first wire grid polarizer 121 may have a lower reflectivity than the second wire grid polarizer 220. For example, the first wire grid polarizer 121 may include a material having a low reflectivity on top of metal patterns of the first wire grid polarizer 121. In this case, because the first wire grid polarizer 121 on the array substrate 100 has a lower reflectivity than the second wire grid polarizer 220 on the facing substrate 200, ambient light may be transmitted from the first wire grid polarizer 121 toward the liquid crystal layer 300. For example, the first wire grid polarizer 121 may include substantially the same material as the second wire grid polarizer 220.

The planar pattern 225 is disposed on the fourth surface 210b of the second transparent substrate 210. The planar pattern 225 may correspond to the light-blocking portion BP. The planar pattern 225 blocks light from the backlight unit 700. In the present exemplary embodiment, the planar pattern 225 may be disposed in a single layer with the wire grid polarizer 220 on the fourth surface 210b of the second transparent substrate 210. Also, a thickness of the planar pattern 225 may be substantially greater than a thickness of the wire grid polarizer 220. The planar pattern 225 may include substantially the same material as the wire grid polarizer 220. Alternatively, the planar pattern 225 may have a multi-layered structure in which a plurality of metallic materials is stacked.

As mentioned above, the first wire grid polarizer 121, the second wire grid polarizer 220, and the planar pattern 225 in the LCD device are spaced apart from the TFT 130 with the first transparent substrate 110 or the liquid crystal layer 300 arranged therebetween. Therefore, electronic properties of the TFT 130 may be maintained without change as a result of the presence of the first wire grid polarizer 121, the second wire grid polarizer 220, and the planar pattern 225.

The second passivation layer 230 is disposed on the fourth surface 210b of the second transparent substrate 210 on which the second wire grid polarizer 220 and the planar pattern 225 are formed. The second passivation layer 230 may either partially or entirely cover the second wire grid polarizer 220 and the planar pattern. The second passivation layer 230 may include a transparent insulation material.

The backlight unit 700 is disposed under the LCD panel 500. The backlight unit 700 may provide light toward the fourth surface 210b of the facing substrate 200.

As mentioned above, the LCD device according to the present exemplary embodiment of the invention may reflect or transmit light from the backlight unit 700 by the first and second wire grid polarizers 121, 220 and the planar pattern to improve light usage efficiency. Also, the first and second wire grid polarizers 121, 220 may be spaced apart from the TFT 130 to reduce crosstalk among the first and second wire grid polarizers 121, 220, the planar pattern 225 and the TFT 130.

Figure 14:
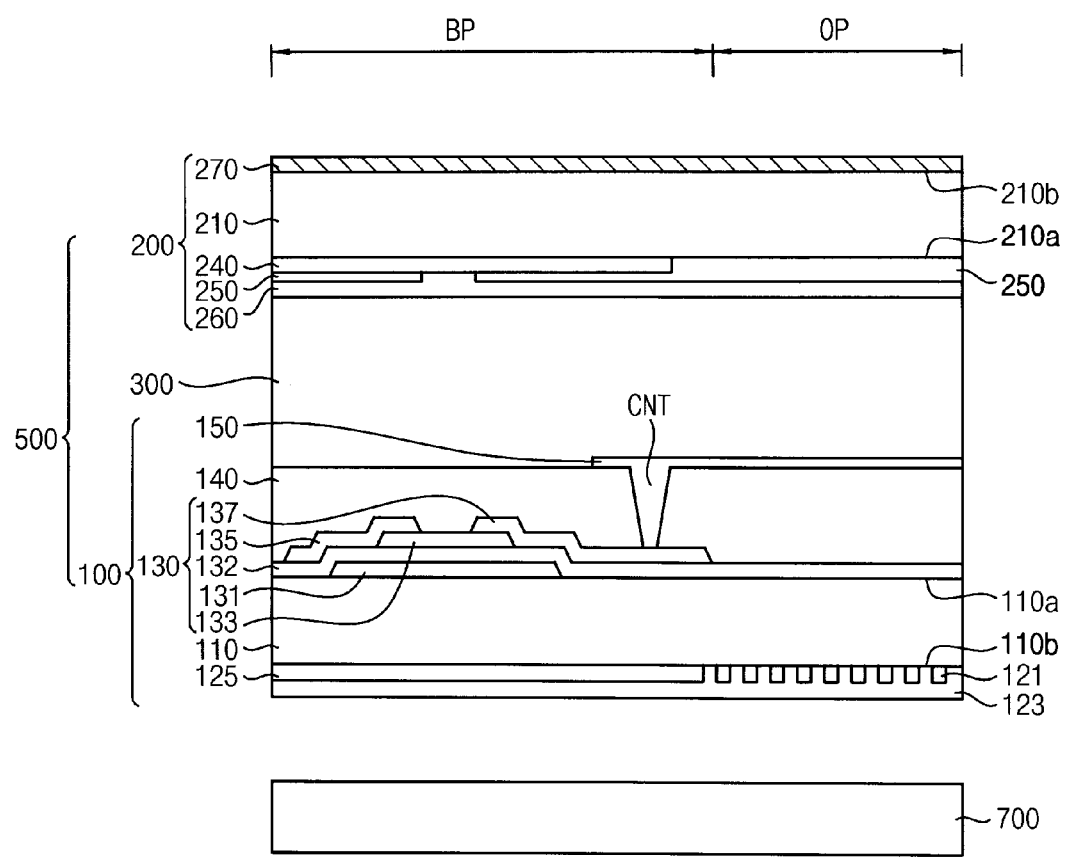

FIG. 14 is a cross-sectional view of an LCD device according to another exemplary embodiment of the invention.

Referring to FIG. 14, an LCD device according to the present exemplary embodiment of the invention includes an LCD panel 500 and a backlight unit 700. The LCD panel 500 includes an array substrate 100, a facing substrate 200 and a liquid crystal layer 300. The LCD panel 500 has an opening portion OP and a light-blocking portion BP. The opening portion OP may allow light from the backlight unit 700 to be transmitted toward outside while the light-blocking portion BP may block the light from the backlight unit 700. The LCD device according to the present exemplary embodiment is substantially the same as the LCD device illustrated in FIG. 1 except for the dispositions of the array substrate 100, the facing substrate 200, a wire grid polarizer 121, and a planar pattern. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed under the liquid crystal layer 300 while the facing substrate 200 is disposed on the liquid crystal layer 300. The backlight unit 700 is disposed under the array substrate 100.

The array substrate 100 includes a first transparent substrate 110, a wire grid polarizer 121, a planar pattern 125, a passivation layer 123, a TFT 130, a gate insulation layer 132, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

Hereinafter, when certain elements are disposed on the first surface 110a, those elements are considered to be sequentially disposed on an upper surface of the first transparent substrate 110. Similarly, when certain elements are disposed on the second surface 110b, those elements are considered to be sequentially disposed on a lower surface of the first transparent substrate 110.

The gate electrode 131 is disposed on the first surface 110a of the first transparent substrate 110 corresponding to the light-blocking portion BP.

The gate insulation layer 132 is disposed on the first surface 110a of the first transparent substrate 110 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The wire grid polarizer 121 is disposed on the second surface 110b of the first transparent substrate 110. The wire grid polarizer 121 may correspond to the opening portion OP. For example, the wire grid polarizer 121 may be spaced apart from the TFT 130 in a horizontal direction in a plan view. The wire grid polarizer 121 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 121 may be extended in parallel in a direction. In this case, incident light perpendicular to the direction may be transmitted through the wire grid polarizer 121 while incident light substantially parallel to the direction may be reflected by the wire grid polarizer 121.

The planar pattern 125 is disposed on the second surface 110b of the first transparent substrate 110. The planar pattern 125 may correspond to the light-blocking portion BP. The planar pattern 125 blocks light from the backlight unit 700. In the present exemplary embodiment, the planar pattern 125 may be disposed in a single layer with the wire grid polarizer 121 on the second surface 110b of the first transparent substrate 110. Also, a thickness of the planar pattern 125 may be substantially the same as a thickness of the wire grid polarizer 121. The planar pattern 125 may include substantially the same material as the wire grid polarizer 121. Alternatively, the planar pattern 125 may have a multi-layered structure in which a plurality of metallic materials is stacked.

In the present exemplary embodiment, the wire grid polarizer 121 and the planar pattern 125 in the LCD device are spaced apart from the TFT 130 with the first transparent substrate 110 arranged therebetween. Therefore, electronic properties of the TFT 130 may be maintained without change as a result of the presence of the wire grid polarizer 121 and the planar pattern 125.

The passivation layer 123 is disposed on the second surface 110b of the first transparent substrate 110 on which the wire grid polarizer 121 and the planar pattern 125 are formed. The passivation layer 123 may either partially or entirely cover the wire grid polarizer 121 and the planar pattern 125. The passivation layer 123 may include a transparent insulation material.

The facing substrate 200 includes a second transparent substrate 210, a light absorption polarizer 270, a light blocking pattern 240, a color filter pattern 250, and a common electrode 260.

The second transparent substrate 210 includes a third surface 210a and a fourth surface 210b opposite to the third surface 210a. The second transparent substrate 210 includes a transparent insulation material. The second transparent substrate 210 may include substantially the same material as the first transparent substrate 110.

Hereinafter, when certain elements are disposed on the third surface 210a, those elements are considered to be sequentially disposed on a lower surface of the second transparent substrate 210. Similarly, when certain elements are disposed on the fourth surface 210b, those elements are considered to be sequentially disposed on an upper surface of the second transparent substrate 210.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The light absorption polarizer 270 is disposed on the fourth surface 210b of the second transparent substrate 210.

The backlight unit 700 is disposed under the LCD panel 500. The backlight unit 700 may provide light toward the second surface 110b of the array substrate 100.

As mentioned above, the LCD device according to the present exemplary embodiment of the invention may reflect or transmit light from the backlight unit 700 by the wire grid polarizer 121 and the planar pattern 125 to improve light usage efficiency. Also, the wire grid polarizer 121 and the planar pattern 125 may be spaced apart from the TFT 130 to reduce crosstalk among the wire grid polarizer 121, the planar pattern 125 and the TFT 130.

Figure 15:
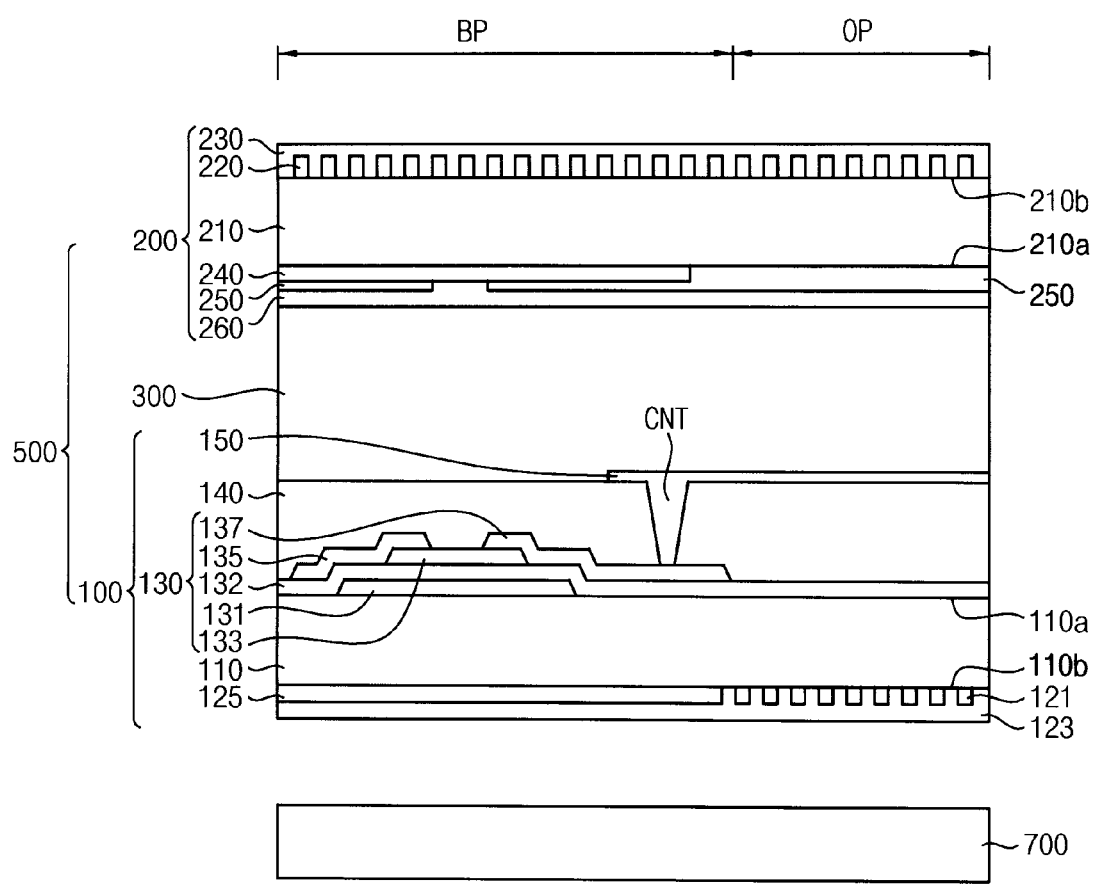

FIG. 15 is a cross-sectional view of an LCD device according to another exemplary embodiment of the invention.

Referring to FIG. 15, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward outside while the light-blocking portion BP may block the light from the backlight unit 700. The LCD device according to the present exemplary embodiment is substantially the same as the LCD device illustrated in FIG. 14 except that the facing substrate 200 includes a second wire grid polarizer 220 and a second passivation layer 230. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed under the liquid crystal layer 300 while the facing substrate 200 is disposed on the liquid crystal layer 300. The backlight unit 700 is disposed under the array substrate 100.

The array substrate 100 includes a first transparent substrate 110, a first wire grid polarizer 121, a planar pattern 125, a first passivation layer 123, a TFT 130, a gate insulation layer 132, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The gate electrode 131 is disposed on the first surface 110a of the first transparent substrate 110 corresponding to the light-blocking portion BP.

The gate insulation layer 132 is disposed on the first surface 110a of the first transparent substrate 110 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The first wire grid polarizer 121 is disposed on the second surface 110b of the first transparent substrate 110. The first wire grid polarizer 121 may correspond to the opening portion OP. For example, the first wire grid polarizer 121 may be spaced apart from the TFT 130 in a horizontal direction in a plan view. The first wire grid polarizer 121 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the first wire grid polarizer 121 may be extended in parallel in a direction. In this case, incident light perpendicular to the direction may be transmitted through the first wire grid polarizer 121 while incident light substantially parallel to the direction may be reflected by the first wire grid polarizer 121.

The planar pattern 125 is disposed on the second surface 110b of the first transparent substrate 110. The planar pattern 125 may correspond to the light-blocking portion BP. The planar pattern 125 blocks light from the backlight unit 700. In the present exemplary embodiment, the planar pattern 125 may be disposed in a single layer with the first wire grid polarizer 121 on the second surface 110b of the first transparent substrate 110. Also, a thickness of the planar pattern 125 may be substantially the same as a thickness of the first wire grid polarizer 121. The planar pattern 125 may include substantially the same material as the first wire grid polarizer 121. Alternatively, the planar pattern 125 may have a multi-layered structure in which a plurality of metallic materials is stacked.

In the present exemplary embodiment, the first wire grid polarizer 121 and the planar pattern 125 in the LCD device are spaced apart from the TFT 130 with the first transparent substrate 110 arranged therebetween. Therefore, electronic properties of the TFT 130 may be maintained without change as a result of the presence of the first wire grid polarizer 121 and the planar pattern 125.

The first passivation layer 123 is disposed on the second surface 110b of the first transparent substrate 110 on which the first wire grid polarizer 121 and the planar pattern 125 are formed. The first passivation layer 123 may either partially or entirely cover the first wire grid polarizer 121 and the planar pattern 125. The first passivation layer 123 may include a transparent insulation material.

The facing substrate 200 includes a second transparent substrate 210, a second wire grid polarizer 220, a second passivation layer 230, a light blocking pattern 240, a color filter pattern 250, and a common electrode 260.

The second transparent substrate 210 includes a third surface 210a and a fourth surface 210b opposite the third surface 210a. The second transparent substrate 210 includes a transparent insulation material. The second transparent substrate 210 may include substantially the same material as the first transparent substrate 110.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The second wire grid polarizer 220 is disposed on the fourth surface 210b of the second transparent substrate 210. The second wire grid polarizer 220 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the second wire grid polarizer 220 may be extended in parallel in a direction. The second wire grid polarizer 220 corresponds to both of the opening portion OP and the light-blocking portion BP.

In the present exemplary embodiment, the second wire grid polarizer 220 may have a lower reflectivity than the first wire grid polarizer 121. For example, the second wire grid polarizer 220 may include a material having a low reflectivity on top of metal patterns of the second wire grid polarizer 220. In this case, as the second wire grid polarizer 220 on the facing substrate 200 has a lower reflectivity than the first wire grid polarizer 121 on the array substrate 100, outer light may transmit the second wire grid polarizer 220 toward the liquid crystal layer 300. For example, the second wire grid polarizer 220 may include substantially the same material as the first wire grid polarizer 121.

As mentioned above, the second wire grid polarizer 220 is spaced apart from the TFT 130 with both the second transparent substrate 210 and the liquid crystal layer 300 arranged therebetween. Therefore, electronic properties of the TFT 130 may be maintained without change as a result of the presence of the second wire grid polarizer 220.

The second passivation layer 230 is disposed on the fourth surface 210b of the second transparent substrate 210 on which the second wire grid polarizer 220 is formed. The second passivation layer 230 may either partially or entirely cover the second wire grid polarizer 220. The second passivation layer 230 may include a transparent insulation material.

The backlight unit 700 is disposed under the LCD panel 500. The backlight unit 700 may provide light toward the second surface 110b of the array substrate 100.

As mentioned above, the LCD device according to the present exemplary embodiment of the invention may reflect or transmit light from the backlight unit 700 by the first and second wire grid polarizers 121, 220 and the planar pattern 125 to improve light usage efficiency. Also, the first and second wire grid polarizers 121, 220 and the planar pattern 125 may be spaced apart from the TFT 130 to reduce crosstalk among the first and second wire grid polarizers 121, the planar pattern 125 and the TFT 130.

Figure 16:
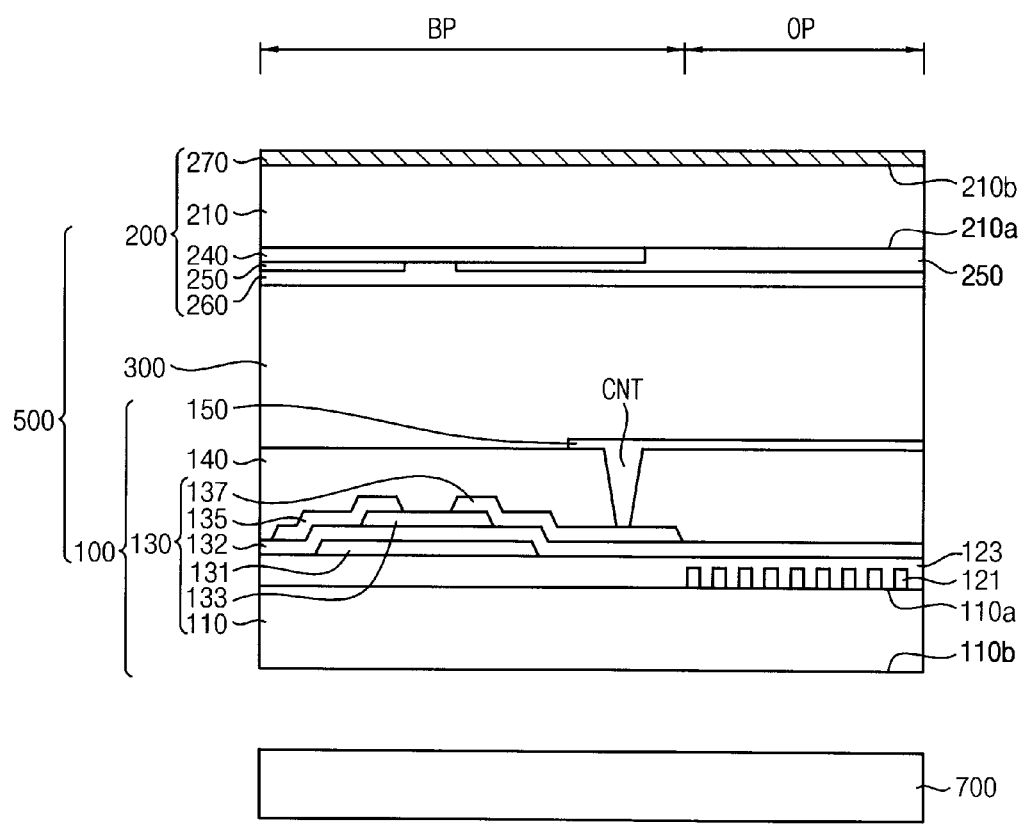

FIG. 16 is a cross-sectional view of an LCD device according to another exemplary embodiment of the invention.

Referring to FIG. 16, an LCD device according to the present exemplary embodiment of the invention includes an LCD panel 500 and a backlight unit 700. The LCD panel 500 includes an array substrate 100, a facing substrate 200 and a liquid crystal layer 300. The LCD panel 500 has an opening portion OP and a light-blocking portion BP. The opening portion OP may allow light from the backlight unit 700 to be transmitted toward outside while the light-blocking portion BP may block the light from the backlight unit 700. The LCD device according to the present exemplary embodiment is substantially the same as the LCD device illustrated in FIG. 14 except for: (a) a disposition of a wire grid polarizer 121; and (b) the array substrate 100 does not include a planar pattern. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed under the liquid crystal layer 300 while the facing substrate 200 is disposed on the liquid crystal layer 300. The backlight unit 700 is disposed under the array substrate 100.

The array substrate 100 includes a first transparent substrate 110, a wire grid polarizer 121, a passivation layer 123, a TFT 130, a gate insulation layer 132, an organic insulation layer 140, and a pixel electrode 150. The TFT 130 corresponds to the light-blocking portion BP. The TFT 130 includes a gate electrode 131, a semiconductor pattern 133, a source electrode 135 and a drain electrode 137.

The first transparent substrate 110 has a first surface 110a and a second surface 110b opposite to the first surface 110a. The first transparent substrate 110 includes a transparent insulation material.

The wire grid polarizer 121 is disposed on the first surface 110a of the first transparent substrate 110 corresponding only to the opening portion OP. For example, the wire grid polarizer 121 may be spaced apart from the TFT 130 in a horizontal direction in a plan view. The wire grid polarizer 121 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 121 may be extended in parallel in a direction. In this case, incident light perpendicular to the direction may be transmitted through the wire grid polarizer 121 while incident light substantially parallel to the direction may be reflected by the wire grid polarizer 121.

The passivation layer 123 is disposed on the first surface 110a of the first transparent substrate 110 on which the wire grid polarizer 121 is formed. The passivation layer 123 may either partially or entirely cover the wire grid polarizer 121. The passivation layer 123 may include a transparent insulation material.

The gate electrode 131 is disposed on the passivation layer 123 corresponding to the light-blocking portion BP.

The gate insulation layer 132 is disposed on the passivation layer 123 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

In the present exemplary embodiment, the wire grid polarizer 121 in the LCD device is disposed only in the opening portion OP to be spaced apart from the TFT 130 in the light-blocking portion BP. Therefore, electronic properties of the TFT 130 may be maintained without change as a result of the presence of the wire grid polarizer 121.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The facing substrate 200 includes a second transparent substrate 210, a light absorption polarizer 270, a light blocking pattern 240, a color filter pattern 250, and a common electrode 260.

The second transparent substrate 210 includes a third surface 210a and a fourth surface 210b opposite to the third surface 210a. The second transparent substrate 210 includes a transparent insulation material. The second transparent substrate 210 may include substantially the same material as the first transparent substrate 110.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The light absorption polarizer 270 is disposed on the fourth surface 210b of the second transparent substrate 210.

The backlight unit 700 is disposed under the LCD panel 500. The backlight unit 700 may provide light toward the second surface 110b of the array substrate 100.

As mentioned above, the LCD device according to the present exemplary embodiment of the invention may reflect or transmit light from the backlight unit 700 by the wire grid polarizer 121 to improve light usage efficiency. Also, the wire grid polarizer 121 may be spaced apart from the TFT 130 to reduce crosstalk between the wire grid polarizer 121 and the TFT 130.

Figure 17:
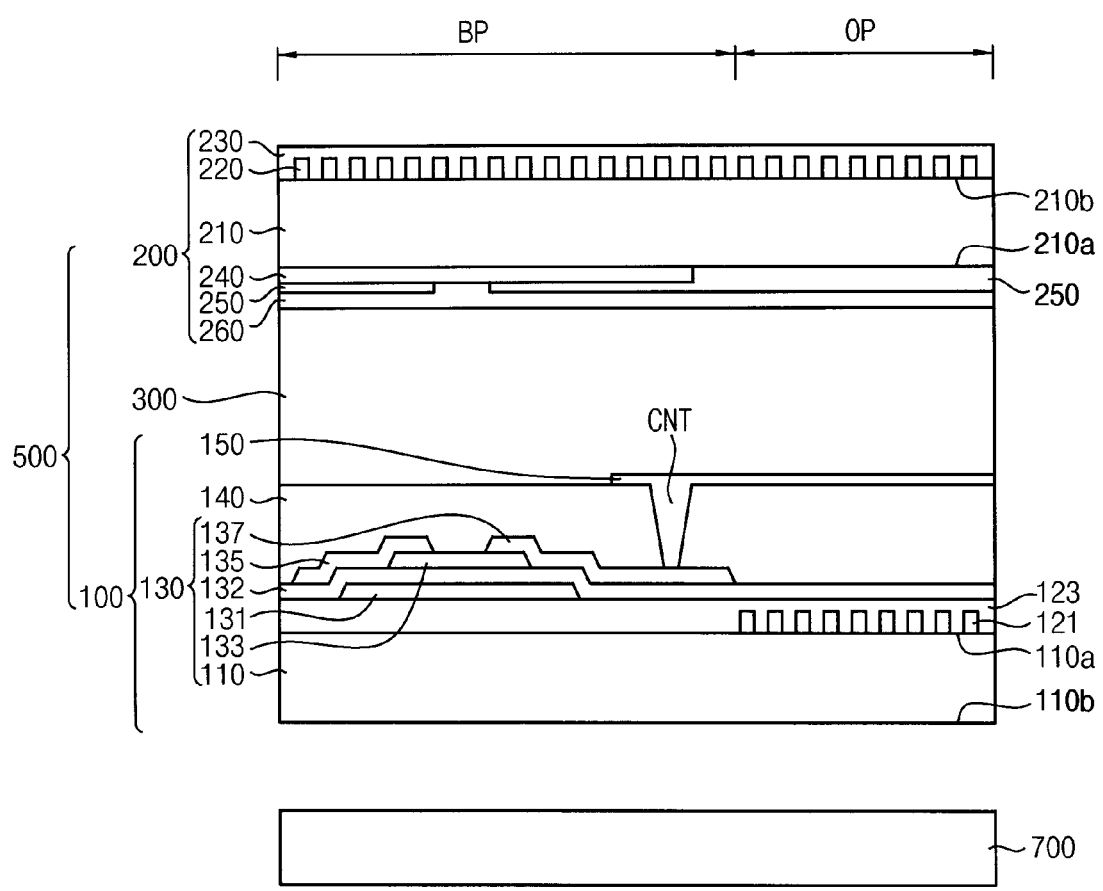

FIG. 17 is a cross-sectional view of an LCD device according to another exemplary embodiment of the invention.

Referring to FIG. 17, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 16 except that the facing substrate 200 includes a second wire grid polarizer 220 and a second passivation layer 230. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed under the liquid crystal layer 300 while the facing substrate 200 is disposed on the liquid crystal layer 300. The backlight unit 700 is disposed under the array substrate 100.

The array substrate 100 includes a first transparent substrate 110, a first wire grid polarizer 121, a first passivation layer 123, a TFT 130, a gate insulation layer 132, an organic insulation layer 140, and a pixel electrode 150. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite the first surface 110a. The first transparent substrate 110 includes a transparent insulation material.

The first wire grid polarizer 121 is disposed on the first surface 110a of the first transparent substrate 110 corresponding only to the opening portion OP. For example, the first wire grid polarizer 121 may be spaced apart from the TFT 130 in a horizontal direction in a plan view. The first wire grid polarizer 121 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the first wire grid polarizer 121 may be extended in parallel in a direction. In this case, incident light perpendicular to the direction may be transmitted through the wire grid polarizer 121 while incident light substantially parallel to the direction may be reflected by the wire grid polarizer 121.

The first passivation layer 123 is disposed on the first surface 110a of the first transparent substrate 110 on which the first wire grid polarizer 121 is formed. The first passivation layer 123 may cover the first wire grid polarizer 121 entirely or partially. The first passivation layer 123 may include a transparent insulation material.

The gate electrode 131 is disposed on the first passivation layer 123 corresponding to the light-blocking portion BP.

The gate insulation layer 132 is disposed on the first passivation layer 123 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

In the present exemplary embodiment, the first wire grid polarizer 121 in the LCD device is disposed only in the opening portion OP to be spaced apart from the TFT 130 in the light-blocking portion BP. Therefore, electronic properties of the TFT 130 may be maintained without change as a result of the presence of the first wire grid polarizer 121.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The facing substrate 200 includes a second transparent substrate 210, a second wire grid polarizer 220, a second passivation layer 230, a light blocking pattern 240, a color filter pattern 250, and a common electrode 260.

The second transparent substrate 210 includes a third surface 210a and a fourth surface 210b opposite to the third surface 210a. The second transparent substrate 210 includes a transparent insulation material. The second transparent substrate 210 may include substantially the same material as the first transparent substrate 110.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The second wire grid polarizer 220 is disposed on the fourth surface 210b of the second transparent substrate 210. The second wire grid polarizer 220 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the second wire grid polarizer 220 may be extended in parallel in a direction. The second wire grid polarizer 220 corresponds to both of the opening portion OP and the light-blocking portion BP.

In the present exemplary embodiment, the second wire grid polarizer 220 may have a lower reflectivity than the first wire grid polarizer 121. For example, the second wire grid polarizer 220 may include a material having a low reflectivity on top of metal patterns of the second wire grid polarizer 220. In this case, because the second wire grid polarizer 220 on the facing substrate 200 has a lower reflectivity than the first wire grid polarizer 121 on the array substrate 100, ambient light may transmit the second wire grid polarizer 220 toward the liquid crystal layer 300. For example, the second wire grid polarizer 220 may include substantially the same material as the first wire grid polarizer 121.

As mentioned above, the second wire grid polarizer 220 is spaced apart from the TFT 130 with both the second transparent substrate 210 and the liquid crystal layer 300 arranged therebetween. Therefore, electronic properties of the TFT 130 may be maintained without change as a result of the presence of the second wire grid polarizer 220.

The second passivation layer 230 is disposed on the fourth surface 210b of the second transparent substrate 210 on which the second wire grid polarizer 220 is formed. The second passivation layer 230 may either partially or entirely cover the second wire grid polarizer 220. The second passivation layer 230 may include a transparent insulation material.

The backlight unit 700 is disposed under the LCD panel 500. The backlight unit 700 may provide light toward the second surface 110b of the array substrate 100.

As mentioned above, the LCD device according to the present exemplary embodiment of the invention may reflect or transmit light from the backlight unit 700 by the first and second wire grid polarizers 121, 220 to improve light usage efficiency. Also, the first and second wire grid polarizers 121, 220 may be spaced apart from the TFT 130 to reduce crosstalk among the first and second wire grid polarizer 121, 220 and the TFT 130.

Figure 18:
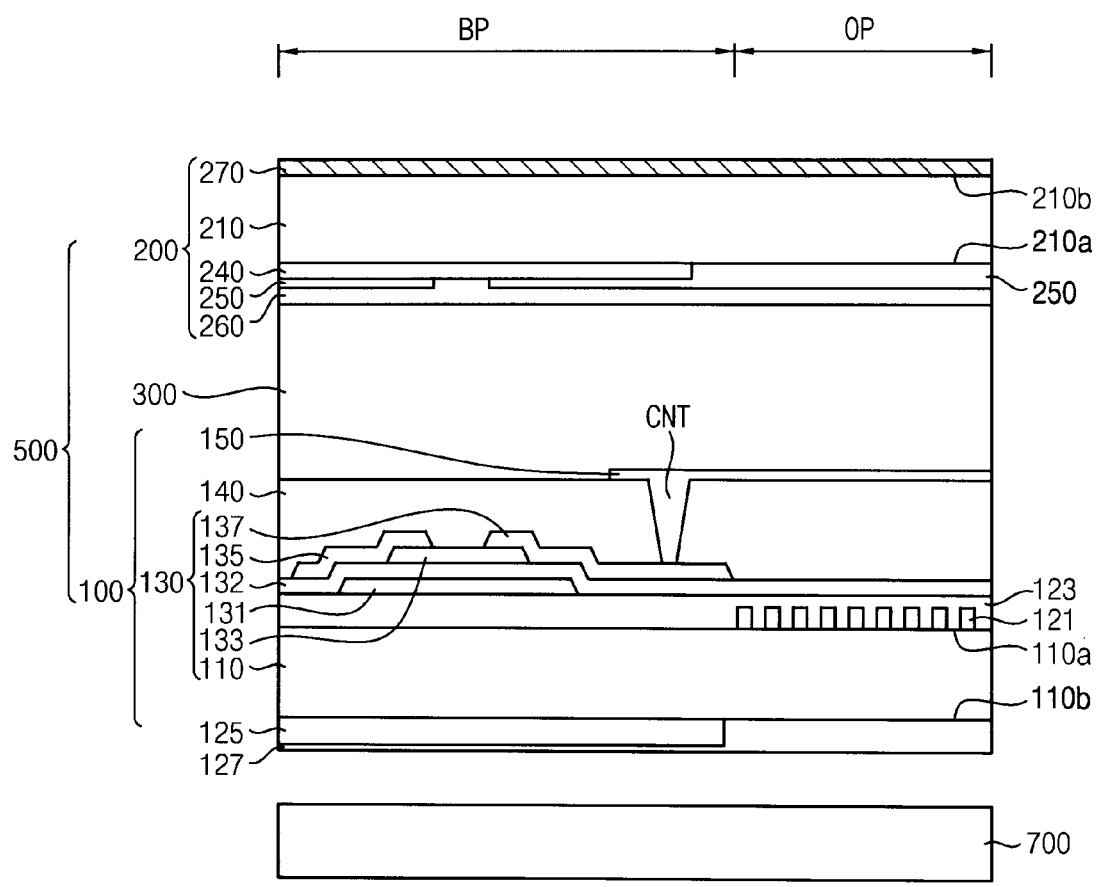

FIG. 18 is a cross-sectional view of an LCD device according to another exemplary embodiment of the invention.

Referring to FIG. 18, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 16 except that the array substrate 100 includes a planar pattern 125 on a second surface 110b. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed under the liquid crystal layer 300 while the facing substrate 200 is disposed on the liquid crystal layer 300. The backlight unit 700 is disposed under the array substrate 100.

The array substrate 100 includes a first transparent substrate 110, a wire grid polarizer 121, a first passivation layer 123, a TFT 130, a gate insulation layer 132, an organic insulation layer 140, a pixel electrode 150, a planar pattern 125, and a second passivation layer 127. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite to the first surface 110a. The first transparent substrate 110 includes a transparent insulation material.

The wire grid polarizer 121 is disposed on the first surface 110a of the first transparent substrate 110 corresponding only to the opening portion OP. For example, the wire grid polarizer 121 may be spaced apart from the TFT 130 in a horizontal direction in a plan view. The wire grid polarizer 121 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 121 may be extended in parallel in a direction. In this case, incident light perpendicular to the direction may be transmitted through the wire grid polarizer 121 while incident light substantially parallel to the direction may be reflected by the wire grid polarizer 121.

The first passivation layer 123 is disposed on the first surface 110a of the first transparent substrate 110 on which the wire grid polarizer 121 is formed. The first passivation layer 123 may either partially or entirely cover the wire grid polarizer 121. The first passivation layer 123 may include a transparent insulation material.

The gate electrode 131 is disposed on the first passivation layer 123 corresponding to the light-blocking portion BP.

The gate insulation layer 132 is disposed on the first passivation layer 123 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

In the present exemplary embodiment, the wire grid polarizer 121 in the LCD device is disposed only in the opening portion OP to be spaced apart from the TFT 130 in the light-blocking portion BP. Therefore, electronic properties of the TFT 130 may be maintained without change as a result of the presence of the wire grid polarizer 121.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The planar pattern 125 is disposed on the second surface 110b of the first transparent substrate 110. The planar pattern 125 corresponds to the light-blocking portion BP. The planar pattern 125 blocks light from the backlight unit 700. The planar pattern 125 may include substantially the same material as the first wire grid polarizer 121. Alternatively, the planar pattern 125 may have a multi-layered structure in which a plurality of metallic materials is stacked.

In the present exemplary embodiment, the planar pattern 125 in the LCD device is spaced apart from the TFT 130 with the first transparent substrate 110 arranged therebetween. Therefore, electronic properties of the TFT 130 may be maintained without change as a result of the presence of the planar pattern 125.

The second passivation layer 127 is disposed on the second surface 110b of the first transparent substrate 110 on which the planar pattern 125 is formed. The second passivation layer 127 may either partially or entirely cover the planar pattern 125. The second passivation layer 127 may include a transparent insulation material.

The facing substrate 200 includes a second transparent substrate 210, a light absorption polarizer 270, a light blocking pattern 240, a color filter pattern 250, and a common electrode 260.

The second transparent substrate 210 includes a third surface 210a and a fourth surface 210b opposite to the third surface 210a. The second transparent substrate 210 includes a transparent insulation material. The second transparent substrate 210 may include substantially the same material as the first transparent substrate 110.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The light absorption polarizer 270 is disposed on the fourth surface 210b of the second transparent substrate 210.

The backlight unit 700 is disposed under the LCD panel 500. The backlight unit 700 may provide light toward the second surface 110b of the array substrate 100.

As mentioned above, the LCD device according to the present exemplary embodiment of the invention may reflect or transmit light from the backlight unit 700 by the wire grid polarizer 121 and the planar pattern 125 to improve light usage efficiency. Also, the wire grid polarizer 121 and the planar pattern 125 may be spaced apart from the TFT 130 to reduce crosstalk among the wire grid polarizer 121, the planar pattern 125 and the TFT 130.

Figure 19:
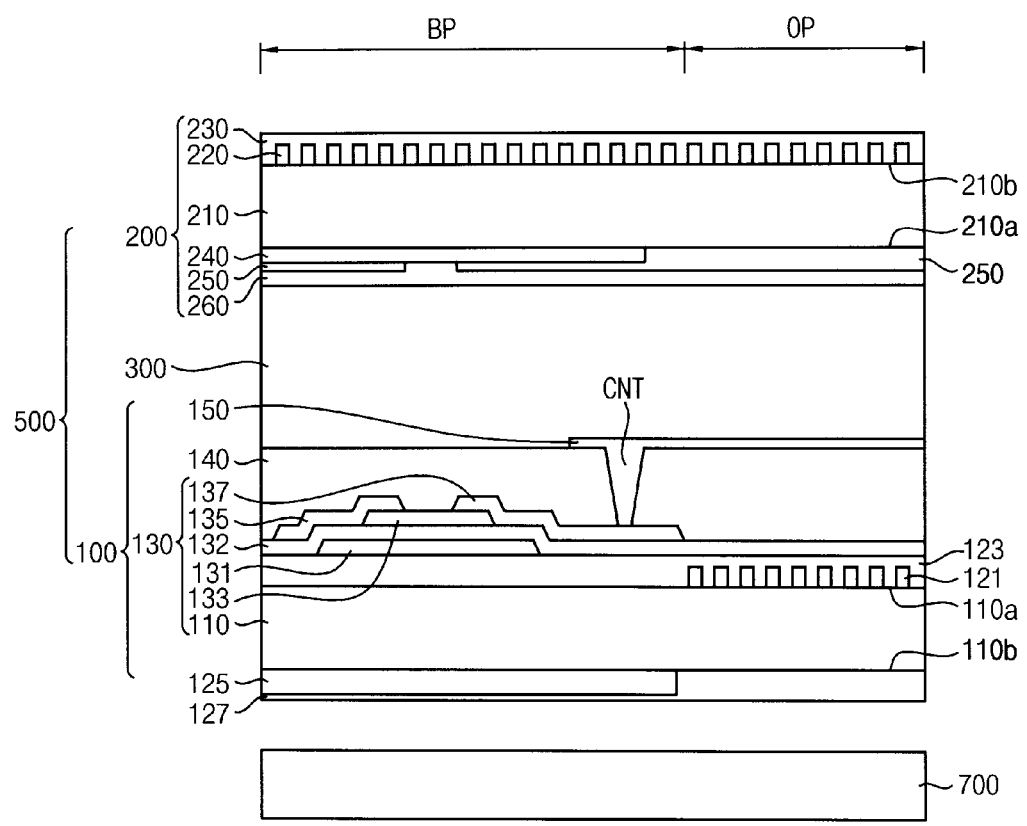

FIG. 19 is a cross-sectional view of an LCD device according to another exemplary embodiment of the invention.

Referring to FIG. 19, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 18 except that the facing substrate 200 includes a second wire grid polarizer 220 and a third passivation layer 230. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed under the liquid crystal layer 300 while the facing substrate 200 is disposed on the liquid crystal layer 300. The backlight unit 700 is disposed under the array substrate 100.

The array substrate 100 includes a first transparent substrate 110, a first wire grid polarizer 121, a first passivation layer 123, a TFT 130, a gate insulation layer 132, an organic insulation layer 140, a pixel electrode 150, a planar pattern 125, and a second passivation layer 127. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite to the first surface 110a. The first transparent substrate 110 includes a transparent insulation material.

The first wire grid polarizer 121 is disposed on the first surface 110a of the first transparent substrate 110 corresponding only to the opening portion OP. For example, the first wire grid polarizer 121 may be spaced apart from the TFT 130 in a horizontal direction in a plan view. The first wire grid polarizer 121 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the first wire grid polarizer 121 may be extended in parallel in a direction. In this case, incident light perpendicular to the direction may be transmitted through the first wire grid polarizer 121 while incident light substantially parallel to the direction may be reflected by the first wire grid polarizer 121.

The first passivation layer 123 is disposed on the first surface 110a of the first transparent substrate 110 on which the first wire grid polarizer 121 is formed. The first passivation layer 123 may either partially or entirely cover the first wire grid polarizer 121. The first passivation layer 123 may include a transparent insulation material.

The gate electrode 131 is disposed on the first passivation layer 123 corresponding to the light-blocking portion BP.

The gate insulation layer 132 is disposed on the first passivation layer 123 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

In the present exemplary embodiment, the first wire grid polarizer 121 in the LCD device is disposed only in the opening portion OP to be spaced apart from the TFT 130 in the light-blocking portion BP. Therefore, electronic properties of the TFT 130 may be maintained without change as a result of the presence of the first wire grid polarizer 121.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The planar pattern 125 is disposed on the second surface 110b of the first transparent substrate 110. The planar pattern 125 corresponds to the light-blocking portion BP. The planar pattern 125 blocks light from the backlight unit 700. The planar pattern 125 may include substantially the same material as the first wire grid polarizer 121. Alternatively, the planar pattern 125 may have a multi-layered structure in which a plurality of metallic materials is stacked.

In the present exemplary embodiment, the planar pattern 125 in the LCD device is spaced apart from the TFT 130 with the first transparent substrate 110 arranged therebetween. Therefore, electronic properties of the TFT 130 may be maintained without change as a result of the presence of the planar pattern 125.

The second passivation layer 127 is disposed on the second surface 110b of the first transparent substrate 110 on which the planar pattern 125 is formed. The second passivation layer 127 may either partially or entirely cover the planar pattern 125. The second passivation layer 127 may include a transparent insulation material.

The facing substrate 200 includes a second transparent substrate 210, a second wire grid polarizer 220, a third passivation layer 230, a light blocking pattern 240, a color filter pattern 250, and a common electrode 260.

The second transparent substrate 210 includes a third surface 210a and a fourth surface 210b opposite the third surface 210a. The second transparent substrate 210 includes a transparent insulation material. The second transparent substrate 210 may include substantially the same material as the first transparent substrate 110.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The second wire grid polarizer 220 is disposed on the fourth surface 210b of the second transparent substrate 210. The second wire grid polarizer 220 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the second wire grid polarizer 220 may be extended in parallel in a direction. The second wire grid polarizer 220 corresponds to both of the opening portion OP and the light-blocking portion BP.

In the present exemplary embodiment, the second wire grid polarizer 220 may have a lower reflectivity than the first wire grid polarizer 121. For example, the second wire grid polarizer 220 may include a material having a low reflectivity on top of metal patterns of the second wire grid polarizer 220. In this case, as the second wire grid polarizer 220 on the facing substrate 200 has a lower reflectivity than the first wire grid polarizer 121 on the array substrate 100, outer light may transmit the second wire grid polarizer 220 toward the liquid crystal layer 300. For example, the second wire grid polarizer 220 may include substantially the same material as the first wire grid polarizer 121.

As mentioned above, the second wire grid polarizer 220 is relatively spaced apart from the TFT 130 with both the second transparent substrate 210 and the liquid crystal layer 300 arranged therebetween. Therefore, electronic properties of the TFT 130 may be maintained without change as a result of the presence of the second wire grid polarizer 220.

The third passivation layer 230 is disposed on the fourth surface 210b of the second transparent substrate 210 on which the second wire grid polarizer 220 is formed. The third passivation layer 230 may either partially or entirely cover the second wire grid polarizer 220. The third passivation layer 230 may include a transparent insulation material.

The backlight unit 700 is disposed under the LCD panel 500. The backlight unit 700 may provide light toward the second surface 110b of the array substrate 100.

As mentioned above, the LCD device according to the present exemplary embodiment of the invention may reflect or transmit light from the backlight unit 700 by the first and second wire grid polarizers 121, 220 and the planar pattern 125 to improve light usage efficiency. Also, the first and second wire grid polarizers 121, 220 and the planar pattern 125 may be spaced apart from the TFT 130 to reduce crosstalk among the first and second wire grid polarizers 121, 220, the planar pattern 125 and the TFT 130.

Figure 20:
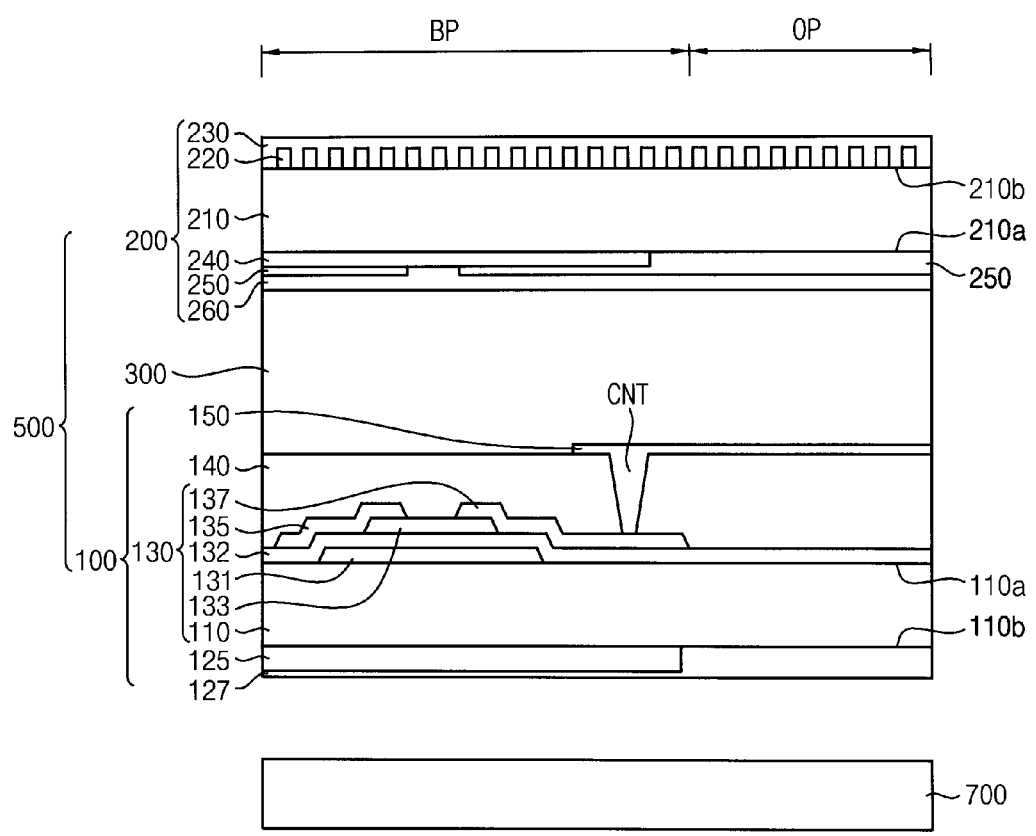

FIG. 20 is a cross-sectional view of an LCD device according to another exemplary embodiment of the invention.

Referring to FIG. 20, an LCD device according to the present exemplary embodiment of the invention includes an LCD panel 500 and a backlight unit 700. The LCD panel 500 includes an array substrate 100, a facing substrate 200, and a liquid crystal layer 300. The LCD panel 500 has an opening portion OP and a light-blocking portion BP. The opening portion OP may allow light from the backlight unit 700 to be transmitted toward the outside while the light-blocking portion BP may block the light from the backlight unit 700. The LCD device according to the present exemplary embodiment is substantially the same as the LCD device illustrated in FIG. 19 except that the array substrate 100 does not include a wire grid polarizer. Hereinafter, details of the identical elements are briefly described.

The array substrate 100 includes a TFT 130 and a pixel electrode 150 electrically connected to the TFT 130. The facing substrate 200 faces the array substrate 100. The liquid crystal layer 300 is disposed between the array substrate 100 and the facing substrate 200.

In the present exemplary embodiment, the array substrate 100 is disposed under the liquid crystal layer 300 while the facing substrate 200 is disposed on the liquid crystal layer 300. The backlight unit 700 is disposed under the array substrate 100.

The array substrate 100 includes a first transparent substrate 110, a TFT 130, a gate insulation layer 132, an organic insulation layer 140, a pixel electrode 150, a planar pattern 125, and a first passivation layer 127. The TFT 130 corresponds to the light-blocking portion BP. The TFT 130 includes a gate electrode 131, a semiconductor pattern 133, a source electrode 135, and a drain electrode 137.

The first transparent substrate 110 has a first surface 110a and a second surface 110b opposite to the first surface 110a. The first transparent substrate 110 includes a transparent insulation material.

The gate electrode 131 is disposed on the first surface 110a of the first transparent substrate 110 corresponding to the light-blocking portion BP.

The gate insulation layer 132 is disposed on the first surface 110a of the first transparent substrate 110 on which the gate electrode 131 is formed.

The semiconductor pattern 133 is disposed on the gate insulation layer 132 overlapping the gate electrode 131.

The source electrode 135 is disposed on the gate insulation layer 132 to overlap an end portion of the semiconductor pattern 133. The drain electrode 137 is disposed on the gate insulation layer 132 to overlap another end portion of the semiconductor pattern 133. The drain electrode 137 is spaced apart from the source electrode 135.

The organic insulation layer 140 is disposed on the first surface 110a of the first transparent substrate 110 on which the TFT 130 is formed. The organic insulation layer 140 may have a substantially flat surface.

The pixel electrode 150 is electrically connected to the drain electrode 137 through a contact hole CNT penetrating the organic insulation layer 140. The pixel electrode 150 may correspond to the opening portion OP. An end portion of the pixel electrode 150 may partially correspond to the light-blocking portion BP.

The planar pattern 125 is disposed on the second surface 110b of the first transparent substrate 110. The planar pattern 125 corresponds to the light-blocking portion BP. The planar pattern 125 blocks light from the backlight unit 700. The planar pattern 125 may include substantially the same material as the first wire grid polarizer 121. Alternatively, the planar pattern 125 may have a multi-layered structure in which a plurality of metallic materials is stacked.

In the present exemplary embodiment, the planar pattern 125 in the LCD device is spaced apart from the TFT 130 with the first transparent substrate 110 arranged therebetween. Therefore, electronic properties of the TFT 130 may be maintained without change as a result of the presence of the planar pattern 125.

The first passivation layer 127 is disposed on the second surface 110b of the first transparent substrate 110 on which the planar pattern 125 is formed. The first passivation layer 127 may either partially or entirely cover the planar pattern 125. The first passivation layer 127 may include a transparent insulation material.

The facing substrate 200 includes a second transparent substrate 210, a wire grid polarizer 220, a second passivation layer 230, a light blocking pattern 240, a color filter pattern 250, and a common electrode 260.

The second transparent substrate 210 includes a third surface 210a and a fourth surface 210b opposite to the third surface 210a. The second transparent substrate 210 includes a transparent insulation material. The second transparent substrate 210 may include substantially the same material as the first transparent substrate 110.

The light blocking pattern 240 is disposed on the third surface 210a of the second transparent substrate 210 corresponding to the light-blocking portion BP. The light blocking pattern 240 may block light which leaks from a boundary of a pixel area. For example, the light blocking pattern 240 may overlap a data line, a gate line, and the TFT 130.

The color filter pattern 250 is disposed on the third surface 210a of the second transparent substrate 210 on which the light blocking pattern 240 is formed. The color filter pattern 250 corresponds to the opening portion OP. Also, the color filter pattern 250 may partially overlap the light blocking pattern 240. The color filter pattern 250 may include a color filter. For example, the color filter pattern 250 may include a red filter, a green filter, or a blue filter.

The common electrode 260 is disposed on the third surface 210a of the second transparent substrate 210 on which the color filter pattern 250 is formed. The common electrode 260 may include a transparent conductive material.

The wire grid polarizer 220 is disposed on the fourth surface 210b of the second transparent substrate 210. The wire grid polarizer 220 includes a plurality of metal patterns spaced apart from each other by a desired interval. The metal patterns have desired widths and thicknesses, respectively. The width and the thickness of the metal patterns may lie within a range among tens of nanometers to hundreds of nanometers. For example, the width, interval, and thickness of the metal patterns may be about 50 nanometers, 50 nanometers, and 150 nanometers, respectively. The metal patterns of the wire grid polarizer 220 may be extended in parallel in a direction. The wire grid polarizer 220 corresponds to both of the opening portion OP and the light-blocking portion BP.

In the present exemplary embodiment, the wire grid polarizer 220 is spaced apart from the TFT 130 with both the second transparent substrate 210 and the liquid crystal layer 300 arranged therebetween. Therefore, electronic properties of the TFT 130 may be maintained without change as a result of the presence of the wire grid polarizer 220.

The second passivation layer 230 is disposed on the fourth surface 210b of the second transparent substrate 210 on which the wire grid polarizer 220 is formed. The second passivation layer 230 may cover the wire grid polarizer 220 entirely or partially. The second passivation layer 230 may include a transparent insulation material.

The backlight unit 700 is disposed under the LCD panel 500. The backlight unit 700 may provide light toward the second surface 110b of the array substrate 100.

As mentioned above, the LCD device according to the present exemplary embodiment of the invention may reflect or transmit light from the backlight unit 700 by means of the wire grid polarizer 220 and the planar pattern 125 to improve light usage efficiency. Also, the wire grid polarizer 220 and the planar pattern 125 may be spaced apart from the TFT 130 to reduce crosstalk among the wire grid polarizer 220, the planar pattern 125, and the TFT 130.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a liquid crystal display panel comprising:
a first substrate;
a thin film transistor disposed on the first substrate;
a second substrate facing the first substrate;
a liquid crystal layer disposed between the first substrate and the second substrate; and a first polarizer disposed on the second substrate, the first polarizer comprising metal patterns spaced apart from each other by an interval;

a planar pattern disposed on the second substrate and overlapping the thin film transistor; and a backlight unit configured to provide light to the liquid crystal display panel, the backlight unit facing the second substrate, wherein:

the second substrate is disposed between the liquid crystal layer and the backlight unit;

the first polarizer is spaced apart from the thin film transistor in a horizontal direction in a plan view;

the thin film transistor comprises a gate electrode, a semiconductor pattern, a source electrode, and a drain electrode;

the semiconductor pattern partially overlaps the source electrode and the drain electrode;

the gate electrode is disposed between the semiconductor pattern and the planar pattern;

the planar pattern is disposed on the same surface of the second substrate as the first polarizer; and the planar pattern and the first polarizer are disposed between the second substrate and the backlight unit.

2. The liquid crystal display device of claim 1, wherein the interval of the metal patterns is substantially no greater than a wavelength of visible light.

3. The liquid crystal display device of claim 1, wherein the liquid crystal display panel further comprises a color filter disposed on the second substrate.

4. The liquid crystal display device of claim 1, wherein the liquid crystal display panel further comprises a passivation layer covering the first polarizer.

5. The liquid crystal display device of claim 1, wherein the liquid crystal display panel further comprises a second polarizer disposed on the first substrate, the second polarizer comprising metal patterns spaced apart from each other by an interval.

6. The liquid crystal display device of claim 1, wherein the second polarizer has a lower reflectivity than the first polarizer.

7. The liquid crystal display device of claim 1, wherein the liquid crystal display panel further comprises a light absorption polarizer disposed on the first substrate.

8. The liquid crystal display device of claim 1, wherein the liquid crystal display panel further comprises:

a pixel electrode disposed on the first substrate and electrically connected to the thin film transistor; and a common electrode disposed on the second substrate.

9. A liquid crystal display device comprising:

a liquid crystal display panel comprising an array substrate, a liquid crystal layer, and a facing substrate, the array substrate comprising:

a transparent substrate;

a polarizer disposed on a first surface of the transparent substrate, the polarizer having metal patterns spaced apart from each other by an interval;

a passivation layer covering the polarizer;

a thin film transistor disposed on the passivation layer, the thin film transistor being spaced apart from the polarizer in a horizontal direction; and a planar pattern disposed on a second surface of the transparent substrate, the second surface being disposed opposite the first surface, the planar pattern overlapping the thin film transistor and not overlapping the polarizer; and a backlight unit configured to provide light to the liquid crystal display panel, wherein the planar pattern and the polarizer comprise substantially the same material.

10. The liquid crystal display device of claim 9, wherein the facing substrate comprises a light blocking pattern overlapping the thin film transistor.

11. A liquid crystal display device comprising:

a liquid crystal display panel comprising an array substrate, a liquid crystal layer, and a facing substrate, the array substrate comprising:

a transparent substrate;

a polarizer disposed on a first surface of the transparent substrate, the polarizer having metal patterns spaced apart from each other by an interval;

a passivation layer covering the polarizer;

a thin film transistor disposed on the passivation layer, the thin film transistor being spaced apart from the polarizer in a horizontal direction; and a planar pattern disposed on a second surface of the transparent substrate, the second surface being disposed opposite the first surface, the planar pattern overlapping the thin film transistor and not overlapping the polarizer; and a backlight unit configured to provide light to the liquid crystal display panel, wherein the planar pattern comprises a multi-layered structure comprising a plurality of layers of stacked metallic materials.

\* \* \* \* \*